US008785531B2

(12) United States Patent
VanSumeren et al.

(10) Patent No.: US 8,785,531 B2
(45) Date of Patent: Jul. 22, 2014

(54) DISPERSIONS OF OLEFIN BLOCK COPOLYMERS

(75) Inventors: Mark W. VanSumeren, Midland, MI (US); Ronald Wevers, Terneuzen (NL); Charles F. Diehl, Lake Jackson, TX (US); Gary M. Strandburg, Mount Pleasant, MI (US); Brad Maurice Moncla, Lake Jackson, TX (US); Kevin D. Maak, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 1388 days.

(21) Appl. No.: 11/824,765

(22) Filed: Jul. 2, 2007

(65) Prior Publication Data

US 2008/0009586 A1   Jan. 10, 2008

Related U.S. Application Data

(60) Provisional application No. 60/818,911, filed on Jul. 6, 2006.

(51) Int. Cl.
    *C08K 5/16*        (2006.01)

(52) U.S. Cl.
    USPC ............. 524/206; 524/505; 524/543; 521/69; 521/70; 521/144

(58) Field of Classification Search
    USPC ............... 524/505, 543, 206; 521/69, 70, 144
    See application file for complete search history.

(56) References Cited

U.S. PATENT DOCUMENTS

| | | | |
|---|---|---|---|
| 3,585,104 A | 6/1971 | Kleinert |
| 3,645,992 A | 2/1972 | Elston |
| 3,758,643 A | 9/1973 | Fischer |
| 3,806,558 A | 4/1974 | Fischer |
| 4,076,698 A | 2/1978 | Anderson et al. |
| 4,104,210 A | 8/1978 | Coran et al. |
| 4,130,535 A | 12/1978 | Coran et al. |
| 4,202,801 A | 5/1980 | Petersen |
| 4,250,273 A | 2/1981 | Bohm et al. |
| 4,271,049 A | 6/1981 | Coran et al. |
| 4,311,628 A | 1/1982 | Abdou-Sabet et al. |
| 4,340,684 A | 7/1982 | Bohm et al. |
| 4,594,130 A | 6/1986 | Chang et al. |
| 4,599,392 A | 7/1986 | McKinney et al. |
| 4,762,890 A | 8/1988 | Strait et al. |
| 4,793,898 A | 12/1988 | Laamanen et al. |
| 4,927,882 A | 5/1990 | Bayan |
| 4,927,888 A | 5/1990 | Strait et al. |
| 4,950,541 A | 8/1990 | Tabor et al. |
| 4,988,781 A | 1/1991 | McKinney et al. |
| 5,051,478 A | 9/1991 | Puydak et al. |
| 5,248,729 A | 9/1993 | Inoue et al. |
| 5,272,236 A | 12/1993 | Lai et al. |
| 5,278,272 A | 1/1994 | Lai et al. |
| 5,504,172 A | 4/1996 | Imuta et al. |
| 5,539,021 A | 7/1996 | Pate et al. |
| 5,595,628 A | 1/1997 | Gordon et al. |
| 5,677,383 A | 10/1997 | Chum et al. |
| 5,756,659 A | 5/1998 | Hughes et al. |
| 5,844,045 A | 12/1998 | Kolthammer et al. |
| 5,869,575 A | 2/1999 | Kolthammer et al. |
| 5,938,437 A | 8/1999 | DeVincenzo |
| 6,051,681 A | 4/2000 | Dozeman et al. |
| 6,111,023 A | 8/2000 | Chum et al. |
| 6,268,444 B1 | 7/2001 | Klosin et al. |
| 6,316,549 B1 | 11/2001 | Chum et al. |
| 6,423,183 B1 | 7/2002 | Goulet et al. |
| 6,448,341 B1 | 9/2002 | Kolthammer et al. |
| 6,455,636 B2 | 9/2002 | Sanada et al. |
| 6,538,070 B1 | 3/2003 | Cardwell et al. |
| 6,545,088 B1 | 4/2003 | Kolthammer et al. |
| 6,566,446 B1 | 5/2003 | Parikh et al. |
| 6,824,650 B2 | 11/2004 | Lindsay et al. |
| 6,825,295 B2 | 11/2004 | Klosin et al. |
| 6,837,970 B2 | 1/2005 | Ko et al. |
| 6,863,940 B2 | 3/2005 | Silver et al. |
| 6,897,276 B2 | 5/2005 | Boussie et al. |
| 6,953,764 B2 | 10/2005 | Frazier et al. |
| 6,960,635 B2 | 11/2005 | Stevens et al. |
| 7,439,276 B2 | 10/2008 | Strandburg et al. |
| 7,935,755 B2 | 5/2011 | Moncla et al. |
| 2004/0127614 A1 | 7/2004 | Jiang et al. |
| 2005/0021622 A1 | 1/2005 | Cullen |
| 2005/0100754 A1* | 5/2005 | Moncla et al. ................. 428/523 |
| 2006/0148917 A1* | 7/2006 | Radwanski et al. ............ 521/99 |

(Continued)

FOREIGN PATENT DOCUMENTS

| | | |
|---|---|---|
| JP | 8143804 | 6/1996 |
| JP | 2004155851 | 6/2004 |

(Continued)

OTHER PUBLICATIONS

English Patent Abstract of JP2006152222 from esp@cenet, published Jun. 15, 2006, 1 page.
English Patent Abstract of JP2005154562 from esp@cenet, published Jun. 16, 2005, 1 page.
English Patent Abstract of JP2004155851 from esp@cenet, published Jun. 3, 2004, 1 page.
English Patent Abstract of JP2005140835 from esp@cenet, published Jun. 2, 2005, 1 page.
English Patent Abstract of JP8143804 from esp@cenet, published Jun. 4, 1996, 1 page.

(Continued)

*Primary Examiner* — Peter D Mulcahy
(74) *Attorney, Agent, or Firm* — Whyte Hirschboeck Dudek S.C.

(57) ABSTRACT

A dispersion and methods for forming a dispersion that includes a catalytic linear multi-block olefin interpolymer, and at least one dispersing agent, wherein the catalytic linear multi-block olefin interpolymer includes at least one hard segment and at least one soft segment is disclosed. Various applications of the dispersion are also disclosed.

24 Claims, 2 Drawing Sheets

(56) References Cited

U.S. PATENT DOCUMENTS

| | | | | |
|---|---|---|---|---|
| 2006/0199872 | A1* | 9/2006 | Prieto et al. | 521/142 |
| 2006/0199896 | A1* | 9/2006 | Walton et al. | 524/543 |
| 2006/0199930 | A1* | 9/2006 | Li Pi Shan et al. | 526/346 |
| 2006/0205833 | A1* | 9/2006 | Martinez et al. | 521/142 |
| 2007/0160833 | A1* | 7/2007 | Maak et al. | 428/343 |
| 2008/0200891 | A1 | 8/2008 | Kim et al. | |

FOREIGN PATENT DOCUMENTS

| | | |
|---|---|---|
| JP | 2005140835 | 6/2005 |
| JP | 2005154562 | 6/2005 |
| JP | 2006152222 | 6/2006 |
| WO | WO-0001745 | 1/2000 |
| WO | WO-03040195 | 5/2003 |
| WO | WO-2004024740 | 3/2004 |
| WO | WO-2005021622 | 3/2005 |
| WO | WO-2005090425 | 9/2005 |
| WO | WO-2005090426 | 9/2005 |
| WO | WO-2005090427 | 9/2005 |
| WO | 2007/008558 A2 | 1/2007 |
| WO | 2007/011728 A2 | 1/2007 |

OTHER PUBLICATIONS

PCT International Search Report issued in PCT Application No. PCT/US2007/015493 dated Dec. 17, 2007 (3 pages).

PCT Written Opinion issued in PCT Application No. PCT/US2007/015493 dated Dec. 17, 2007 (4 pages).

Written Opinion issued in related Singaporean Applicaion No. 200900004-3 dated Jan. 13, 2010. (7 pages).

Official Action issued Mar. 18, 2010 by the Patent Office of the Russian Federation in corresponding Russian Patent Application No. 2009103922.

Translation of Substantive Technical Examination report issued in corresponding Argentine patent application No. P07013004 (5 pages).

Extended European Search Report for related Application No. 07810210 dated Jul. 16, 2009. (6 pages).

Second Written Opinion issued in related Singaporean Application No. 200900004-3 dated Jul. 15, 2010. (8 pages).

Examiner's Report issued Dec. 22, 2010 in corresponding Canadian application No. 2,656,925 (2 pages).

First Office Action issued by the Chinese Patent Office in corresponding application No. 200780031496.7.

Notice of Preliminary Rejection issued Feb. 14, 2011 by the Korean Patent Office in corresponding application No. 10-2009-7002344.

Examination Report dated Jun. 14, 2011 issued by the Intellectual Property Office of Singapore in corresponding Singapore application No. 200900004-3 (5 pages).

PCT International Preliminary Report of Patentabillity and Written Opinion of the ISR issued in PCT Application No. PCT/US2007/015493 dated Jan. 6, 2009, (6 pages).

Final Office Action issued Jul. 12, 2011 in related U.S. Appl. No. 11/897,022 (10 pages).

Official Letter, along with a Search Report, mailed Aug. 8, 2011 in corresponding Taiwan application No. 96124446 (6 pages).

* cited by examiner

DISPERSIONS OF OLEFIN BLOCK COPOLYMERS

CROSS-REFERENCE TO RELATED APPLICATION

This application claims benefit to U.S. Provisional Application Ser. No. 60/818,911, filed on Jul. 6, 2006.

BACKGROUND OF INVENTION

1. Field of the Invention

The invention relates generally to ethylene/α-olefin block interpolymers, dispersions of ethylene/α-olefin block interpolymers, and products made from the block interpolymers.

2. Background

Aqueous dispersions of a thermoplastic resin of various types are known in the art and have been used in a wide variety of fields. For example, when an aqueous dispersion is coated and dried on a surface of a substrate such as paper, fiber, wood, metal, or plastic molded article, the resin coating formed will provide the substrate with water resistance, oil resistance, chemical resistance, corrosion resistance and heat sealability. An aqueous medium is advantageous compared to an organic dispersion medium in view of common hazards such as flammability, working environment, handling convenience, and the like.

Conventional aqueous dispersions of a thermoplastic resin have been produced either by a process wherein a polymerizable monomer which is the resin raw material is polymerized by emulsion polymerization in an aqueous medium in the presence of a dispersing agent, or by a process wherein a molten thermoplastic resin and an aqueous medium, and optionally, a dispersing agent are mixed by applying shearing force. The former process is associated with the disadvantage of the limited number of the polymerizable monomers that can be used, and hence, the variety of the aqueous dispersions of the thermoplastic resin that can be produced, is limited. The former process also suffers from complicated control of the polymerization reaction as well as intricate equipment. On the other hand, the latter process is applicable to a wide variety of resins in relatively simple equipment.

Coatings and articles produced via aqueous dispersions of typical ethylene copolymers lack the heat resistance and compression set properties needed for many applications. For example, frothed foams made via the frothing and drying of aqueous dispersions of homogeneous ethylene-octene copolymers exhibit the softness required for hygiene and fabric backing applications, but lack the heat resistance required for shipment during the summer months. In addition, coatings and foams to be used in the interior of an automobile typically require heat resistance to at least 60° C. In this environment, frothed foams based on homogeneous, low crystallinity ethylene copolymers will not retain mechanical properties such as compression set.

Accordingly, there exists a need for dispersions and foams formed from ethylene and propylene based interpolymers having improved heat resistance and mechanical properties, including compression set.

SUMMARY OF INVENTION

In one aspect, embodiments disclosed herein relate to a dispersion and methods for forming a dispersion that includes a catalytic linear multi-block olefin interpolymer, and at least one dispersing agent, wherein the catalytic linear multi-block olefin interpolymer includes at least one hard segment and at least one soft segment.

In another aspect, embodiments disclosed herein relate to a polyolefin froth foam, formed from a dispersion that includes a catalytic linear multi-block olefin interpolymer, and at least one dispersing agent, wherein the catalytic linear multi-block olefin interpolymer includes at least one hard segment and at least one soft segment.

In another aspect, embodiments disclosed herein relate to a cellulose-based article, especially having a specific volume of less than 3 cc/gm, that includes a cellulose-based composition; and an applied compound, wherein the applied compound, at the time of application, includes a dispersion formed of a catalytic linear multi-block olefin interpolymer, and at least one dispersing agent, wherein the catalytic linear multi-block olefin interpolymer includes at least one hard segment and at least one soft segment wherein the cellulose-based article has at least one of a water resistance value of less than about 10 g/m$^2$/120 seconds as measured via the Cobb test and an oil and grease resistance value of at least 9 as measured using the Kit test at an exposure time of 15 seconds.

In another aspect, embodiments disclosed herein relate to an article formed by a process that includes impregnating a fibrous structure with a compound, the compound including a dispersion, the dispersion formed from a catalytic linear multi-block olefin interpolymer; and at least one dispersing agent, wherein the catalytic linear multi-block olefin interpolymer includes at least one hard segment and at least one soft segment; and removing at least a portion of the water from the impregnated fibrous structure.

In another aspect, embodiments disclosed herein relate to a toner composition including a dispersion, the dispersion including a catalytic linear multi-block olefin interpolymer, and at least one dispersing agent, wherein the catalytic linear multi-block olefin interpolymer includes at least one hard segment and at least one soft segment; and at least one selected from the group consisting of a colorant and a magnetic pigment, wherein the dispersion has an average volume diameter particle size from about 0.3 to about 8.0 microns.

In another aspect, embodiments disclosed herein relate to a method for forming a heat sealable coating on a substrate including applying a dispersion to a substrate, the dispersion including a catalytic linear multi-block olefin interpolymer; at least one dispersing agent; wherein the catalytic linear multi-block olefin interpolymer includes at least one hard segment and at least one soft segment and removing at least a portion of a liquid in the dispersion to form a first layer.

In another aspect, embodiments disclosed herein relate to a method to make a long fiber concentrate that includes fibers and a thermoplastic resin that involves the steps of: coating continuous fibers with a dispersion, wherein the dispersion includes a catalytic linear multi-block olefin interpolymer, at least one dispersing agent, wherein the catalytic linear multi-block olefin interpolymer includes at least one hard segment and at least one soft segment to form thermoplastic coated continuous fiber strands, heating the thermoplastic coated continuous fiber strands, chopping the dried thermoplastic coated continuous fiber strands forming dried long fiber concentrate pellets, and isolating dried long fiber concentrate pellets.

In another aspect, embodiments disclosed herein relate to a method to make a long fiber concentrate including fibers and a thermoplastic resin involving the steps of coating chopped long fibers with a dispersion wherein the dispersion includes a catalytic linear multi-block olefin interpolymer; at least one dispersing agent; wherein the catalytic linear multi-block olefin interpolymer includes at least one hard segment and at least one soft segment to form thermoplastic coated chopped fiber pellets, heating the coated chopped long fiber concentrate pellets, and isolating dried long fiber concentrate pellets.

Other aspects and advantages of the invention will be apparent from the following description and the appended claims.

DETAILED DESCRIPTION

Figure 1:
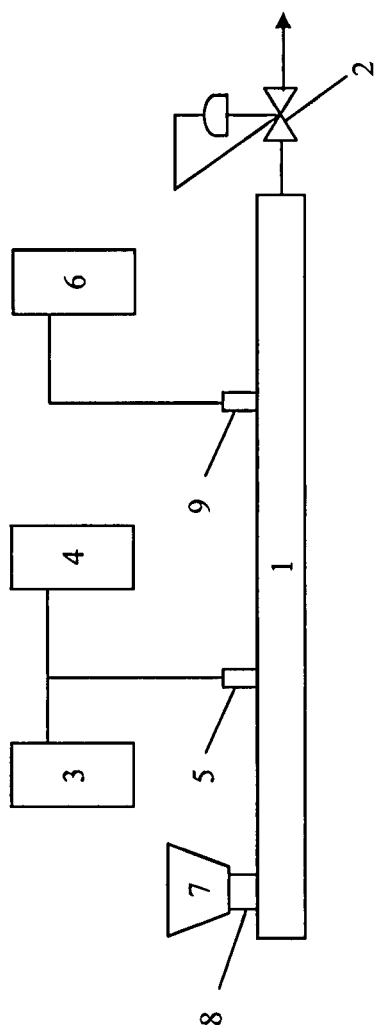
FIG. 1 is a schematic representation of a typical melt-extrusion apparatus used to prepare embodiments of the invention.

In one aspect, embodiments of the invention relate to an aqueous dispersion having a base polymeric component. In other aspects, embodiments disclosed herein relate to an aqueous dispersion having a multi-block olefin interpolymer component and a stabilizing agent component. In other aspects, embodiments disclosed herein relate to an aqueous dispersion where the multi-block olefin interpolymer is an ethylene/α-olefin block interpolymer, a propylene/α-olefin block interpolymer, or combinations thereof.

Dispersions formed in accordance with embodiments disclosed herein may include a base polymer, which may comprise at least one multi-block olefin interpolymer, and a stabilizing agent, which may comprise at least one polar polyolefin. The multi-block olefin interpolymer, in some embodiments, may be propylene-based interpolymers, ethylene-based interpolymers, or combinations thereof.

Dispersions formed in accordance with other embodiments disclosed herein may include a base polymer, which may include at least one multi-block olefin interpolymer, a secondary polymeric component, which may include at least one thermoplastic polyolefin, and a stabilizing agent.

Benefits derived from a multi-block olefin interpolymer may also be realized where the multi-block interpolymer is used as a minority component in a dispersion. Accordingly, dispersions formed in accordance with yet other embodiments disclosed herein may include a base polymer, which may include at least one non-polar thermoplastic polyolefin, a secondary polymeric component, which may include at least one multi-block olefin interpolymer, and a stabilizing agent.

Dispersions formed in accordance with other embodiments may also include fillers, additives, and adjutants. Based on the above description of embodiments of the dispersions, the individual components and embodiments of the dispersions disclosed herein will be described below.

Multi-Block Olefin Interpolymer

As described above, embodiments of the dispersions disclosed herein may include a polymeric component that may include at least one multi-block olefin interpolymer. The following definitions are provided to distinguish a multi-block olefin interpolymer from other olefin polymers.

"Polymer" means a polymeric compound prepared by polymerizing monomers, whether of the same or a different type. The generic term "polymer" embraces the terms "homopolymer," "copolymer," "terpolymer" as well as "interpolymer."

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The terms "ethylene/α-olefin interpolymer" and "propylene/α-olefin interpolymer" refer to polymers with ethylene or propylene, respectively, being the majority mole fraction of the whole polymer. In some embodiments, the majority monomer may comprise at least 50 mole percent of the whole polymer; at least 60 mole percent in other embodiments; at least 70 mole percent in other embodiments; and at least 80 mole percent in yet other embodiments. The remainder of the whole polymer comprising at least one comonomer. In some embodiments, ethylene/α-olefin interpolymers include ethylene at a content of greater than about 80 mole percent, and an α-olefin content of equal to or less than about 20 mole percent.

The term "crystalline" if employed, refers to a polymer or a segment that possesses a first order transition or crystalline melting point (Tm) as determined by differential scanning calorimetry (DSC) or equivalent technique. The term may be used interchangeably with the term "semi-crystalline". The term "amorphous" refers to a polymer lacking a crystalline melting point as determined by differential scanning calorimetry (DSC) or equivalent technique.

The term "multi-block copolymer" or "segmented copolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In certain embodiments, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of polydispersity index (PDI or $M_w/M_n$), block length distribution, and/or block number distribution due to the unique process making of the copolymers. More specifically, when produced in a continuous process, embodiments of the polymers may possess a PDI ranging from about 1.7 to about 8; from about 1.7 to about 3.5 in other embodiments; from about 1.7 to about 2.5 in other embodiments; and from about 1.8 to about 2.5 or from about 1.8 to about 2.1 in yet other embodiments. When produced in a batch or semi-batch process, embodiments of the polymers may possess a PDI ranging from about 1 to about 2.9; from about 1.3 to about 2.5 in other embodiments; from about 1.4 to about 2 in other embodiments; and from about 1.4 to about 1.8 in yet other embodiments.

One example of the multi-block olefin interpolymer is an ethylene/α-olefin block interpolymer. Another example of the multi-block olefin interpolymer is a propylene/α-olefin interpolymer. The following description focuses on the interpolymer as having ethylene as the majority monomer, but applies in a similar fashion to propylene-based multi-block interpolymers with regard to general polymer characteristics.

The ethylene/α-olefin multi-block interpolymers (hereinafter "ethylene/α-olefin interpolymer" or variations thereof) comprise ethylene and one or more co-polymerizable α-olefin comonomers in polymerized form, characterized by multiple (i.e., two or more) blocks or segments of two or more polymerized monomer units differing in chemical or physical properties (block interpolymer), preferably a multi-block interpolymer. In some embodiments, the multi-block interpolymer may be represented by the following formula:

(AB)$_n$ where n is at least 1, preferably an integer greater than 1, such as 2, 3, 4, 5, 10, 15, 20, 30, 40, 50, 60, 70, 80, 90, 100, or higher; "A" represents a hard block or segment; and "B" represents a soft block or segment. Preferably, A's and B's are linked in a linear fashion, not in a branched or a star fashion. "Hard" segments refer to blocks of polymerized units in which ethylene is present in an amount greater than 95 weight percent in some embodiments, and in other embodiments greater than 98 weight percent. In other words, the comonomer content in the hard segments is less than 5 weight percent in some embodiments, and in other embodiments, less than 2 weight percent of the total weight of the hard segments. In some embodiments, the hard segments comprise all or substantially all ethylene. "Soft" segments, on the other hand, refer to blocks of polymerized units in which the comonomer content is greater than 5 weight percent of the total weight of the soft segments in some embodiments, greater than 8 weight percent, greater than 10 weight percent, or greater than 15 weight percent in various other embodiments. In some embodiments, the comonomer content in the soft segments may be greater than 20 weight percent, greater than 25 eight percent, greater than 30 weight percent, greater than 35 weight percent, greater than 40 weight percent, greater than 45 weight percent, greater than 50 weight percent, or greater than 60 weight percent in various other embodiments.

In some embodiments, A blocks and B blocks are randomly distributed along the polymer chain. In other words, the block copolymers do not have a structure like:

AAA-AA-BBB-BB

In other embodiments, the block copolymers do not have a third block. In still other embodiments, neither block A nor block B comprises two or more segments (or sub-blocks), such as a tip segment.

The ethylene/α-olefin interpolymers are characterized by an average block index, ABI, ranging from greater than zero to about 1.0 and a molecular weight distribution, $M_w/M_n$, greater than about 1.3. The average block index, ABI, is the weight average of the block index ("BI") for each of the polymer fractions obtained in preparative TREF from 20° C. and 110° C., with an increment of 5° C.:

ABI=Σ($w_iB_i$)

where $BI_i$ is the block index for the i$^{th}$ fraction of the ethylene/α-olefin interpolymer obtained in preparative TREF, and $w_i$ is the weight percentage of the i$^{th}$ fraction.

Similarly, the square root of the second moment about the mean, hereinafter referred to as the second moment weight average block index, may be defined as follows:

2$^{nd}$ moment weight average $$BI = \sqrt{\frac{\sum(w_i(BI_i - ABI)^2)}{\frac{(N-1)\sum w_i}{N}}}.$$

For each polymer fraction, BI is defined by one of the two following equations (both of which give the same BI value):

$$BI = \frac{1/T_X - 1/T_{XO}}{1/T_A - 1/T_{AB}} \text{ or } BI = -\frac{LnP_X - LnP_{XO}}{LnP_A - LnP_{AB}}$$

where $T_X$ is the analytical temperature rising elution fractionation (ATREF) elution temperature for the i$^{th}$ fraction (preferably expressed in Kelvin), $P_X$ is the ethylene mole fraction for the i$^{th}$ fraction, which may be measured by NMR or IR as described below. $P_{AB}$ is the ethylene mole fraction of the whole ethylene/α-olefin interpolymer (before fractionation), which also may be measured by NMR or IR. $T_A$ and $P_A$ are the ATREF elution temperature and the ethylene mole fraction for pure "hard segments" (which refer to the crystalline segments of the interpolymer). As an approximation or for polymers where the "hard segment" composition is unknown, the $T_A$ and $P_A$ values are set to those for high density polyethylene homopolymer.

$T_{AB}$ is the ATREF elution temperature for a random copolymer of the same composition (having an ethylene mole fraction of $P_{AB}$) and molecular weight as the multi-block interpolymer. $T_{AB}$ may be calculated from the mole fraction of ethylene (measured by NMR) using the following equation:

$Ln\ P_{AB} = \alpha/T_{AB} + \beta$ where α and β are two constants which may be determined by a calibration using a number of well characterized preparative TREF fractions of a broad composition random copolymer and/or well characterized random ethylene copolymers with narrow composition. It should be noted that α and β may vary from instrument to instrument. Moreover, one would need to create an appropriate calibration curve with the polymer composition of interest, using appropriate molecular weight ranges and comonomer type for the preparative TREF fractions and/or random copolymers used to create the calibration. There is a slight molecular weight effect. If the calibration curve is obtained from similar molecular weight ranges, such effect would be essentially negligible. In some embodiments, random ethylene copolymers and/or preparative TREF fractions of random copolymers satisfy the following relationship:

$Ln\ P = -237.83/T_{ATREF} + 0.639$

The above calibration equation relates the mole fraction of ethylene, P, to the analytical TREF elution temperature, $T_{ATREF}$, for narrow composition random copolymers and/or preparative TREF fractions of broad composition random copolymers. $T_{XO}$ is the ATREF temperature for a random copolymer of the same composition and having an ethylene mole fraction of $P_X$. $T_{XO}$ may be calculated from $LnP_X = \alpha/T_{XO} + \beta$. Conversely, $P_{XO}$ is the ethylene mole fraction for a random copolymer of the same composition and having an ATREF temperature of $T_X$, which may be calculated from $Ln\ P_{XO} = \alpha/T_X + \beta$.

Once the block index (BI) for each preparative TREF fraction is obtained, the weight average block index, ABI, for the whole polymer may be calculated. In some embodiments, ABI is greater than zero but less than about 0.4 or from about 0.1 to about 0.3. In other embodiments, ABI is greater than about 0.4 and up to about 1.0. Preferably, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Another characteristic of the ethylene/α-olefin interpolymer is that the ethylene/α-olefin interpolymer comprises at least one polymer fraction which may be obtained by preparative TREF, wherein the fraction has a block index greater than about 0.1 and up to about 1.0 and the polymer having a molecular weight distribution, $M_w/M_n$, greater than about 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

In addition to an average block index and individual fraction block indices, the ethylene/α-olefin interpolymers may be characterized by one or more of the properties described as follows.

In one aspect, the ethylene/α-olefin interpolymers used in embodiments of the invention have a $M_w/M_n$ from about 1.7 to about 3.5 and at least one melting point, $T_m$, in degrees Celsius and density, d, in grams/cubic centimeter, wherein the numerical values of the variables correspond to the relationship:

$T_m > -2002.9 + 4538.5(d) - 2422.2(d)^2$ in some embodiments;

$T_m \geq -6288.1 + 13141(d) - 6720.3(d)^2$ in other embodiments; and $T_m \geq 858.91 - 1825.3(d) + 1112.8(d)^2$ in yet other embodiments.

Unlike the traditional random copolymers of ethylene/α-olefins whose melting points decrease with decreasing densities, the ethylene/α-olefins interpolymers exhibit melting points substantially independent of the density, particularly when density is between about 0.87 g/cc to about 0.95 g/cc. For example, the melting point of such polymers may be in the range of about 110° C. to about 130° C. when density ranges from 0.875 g/cc to about 0.945 g/cc. In some embodiments, the melting point of such polymers may be in the range of about 115° C. to about 125° C. when density ranges from 0.875 g/cc to about 0.945 g/cc.

In another aspect, the ethylene/α-olefin interpolymers comprise, in polymerized form, ethylene and one or more α-olefins and are characterized by a ΔT, in degree Celsius, defined as the temperature for the tallest Differential Scanning Calorimetry ("DSC") peak minus the temperature for the tallest Crystallization Analysis Fractionation ("CRYSTAF") peak and a heat of fusion in J/g, ΔH, and ΔT and ΔH satisfy the following relationships:

ΔT > -0.1299(ΔH) + 62.81 in some embodiments;

ΔT ≥ -0.1299(ΔH) + 64.38 in other embodiments; and

ΔT ≥ -0.1299(ΔH) + 65.95, in yet other embodiments, for ΔH up to 130 J/g. Moreover, ΔT is equal to or greater than 48° C. for ΔH greater than 130 J/g. The CRYSTAF peak is determined using at least 5 percent of the cumulative polymer (that is, the peak must represent at least 5 percent of the cumulative polymer), and if less than 5 percent of the polymer has an identifiable CRYSTAF peak, then the CRYSTAF temperature is 30° C., and ΔH is the numerical value of the heat of fusion in J/g. More preferably, the highest CRYSTAF peak contains at least 10 percent of the cumulative polymer.

In yet another aspect, the ethylene/α-olefin interpolymers may have a molecular fraction which elutes between 40° C. and 130° C. when fractionated using Temperature Rising Elution Fractionation ("TREF"), characterized in that the fraction has a molar comonomer content higher, at least 5 percent higher in some embodiments, at least 10 percent higher in other embodiments, than that of a comparable random ethylene interpolymer fraction eluting between the same temperatures, wherein the comparable random ethylene interpolymer contains the same comonomer(s), and has a melt index, density, and molar comonomer content (based on the whole polymer) within 10 percent of that of the block interpolymer. In some embodiments, the Mw/Mn of the comparable interpolymer is also within 10 percent of that of the block interpolymer and/or the comparable interpolymer has a total comonomer content within 10 weight percent of that of the block interpolymer.

In still another aspect, the ethylene/α-olefin interpolymers are characterized by an elastic recovery, Re, in percent at 300 percent strain and 1 cycle measured on a compression-molded film of an ethylene/α-olefin interpolymer, and has a density, d, in grams/cubic centimeter, wherein the numerical values of Re and d satisfy the following relationship when ethylene/α-olefin interpolymer is substantially free of a cross-linked phase:

Re > 1481 - 1629(d) in some embodiments;

Re ≥ 1491 - 1629(d) in other embodiments;

Re ≥ 1501 - 1629(d) in other embodiments; and

Re ≥ 1511 - 1629(d) in yet other embodiments.

In some embodiments, the ethylene/α-olefin interpolymers may have a tensile strength above 10 MPa; a tensile strength ≥ 11 MPa in other embodiments; and a tensile strength ≥ 13 MPa in yet other embodiments. In some embodiments, the ethylene/α-olefins interpolymers may have an elongation at break of at least 600 percent at a crosshead separation rate of 11 cm/minute; at least 700 percent in other embodiments; at least 800 percent in other embodiments; and at least 900 percent in yet other embodiments.

In some embodiments, the ethylene/α-olefin interpolymers may have a storage modulus ratio, G'(25° C.)/G'(100° C.), from 1 to 50; from 1 to 20 in other embodiments; and from 1 to 10 in yet other embodiments. In some embodiments, the ethylene/α-olefin interpolymers may have a 70° C. compression set of less than 80 percent; less than 70 percent in other embodiments; less than 60 percent in other embodiments; and, less than 50 percent, less than 40 percent, down to a compression set of 0 percent in yet other embodiments.

In some embodiments, the ethylene/α-olefin interpolymers may have a 85° C. compression set of less than 80 percent; less than 70 percent in other embodiments; less than 60 percent in other embodiments; and, less than 50 percent, less than 40 percent, down to a compression set of 0 percent in yet other embodiments.

In some embodiments, the ethylene/α-olefin interpolymers may have a heat of fusion of less than 85 J/g. In other embodiments, the ethylene/α-olefin interpolymer may have a pellet blocking strength of equal to or less than 100 pounds/foot$^2$ (4800 Pa); equal to or less than 50 lbs/ft$^2$ (2400 Pa) in other embodiments; equal to or less than 5 lbs/ft$^2$ (240 Pa), and as low as 0 lbs/ft$^2$ (0 Pa) in yet other embodiments.

In other embodiments, the ethylene/α-olefin interpolymers may comprise, in polymerized form, at least 50 mole percent ethylene and have a 70° C. compression set of less than 80 percent; less than 70 percent in other embodiments; less than 60 percent in other embodiments; and, less than 50 percent, less than 40 percent, and down to a compression set of 0 percent in yet other embodiments.

In some embodiments, the multi-block copolymers may possess a PDI fitting a Schultz-Flory distribution rather than a Poisson distribution. The copolymers may be further characterized as having both a polydisperse block distribution and a polydisperse distribution of block sizes and possessing a most probable distribution of block lengths. Preferred multi-block copolymers are those containing 4 or more blocks or segments including terminal blocks. More preferably, the copolymers include at least 5, 10 or 20 blocks or segments including terminal blocks.

In addition, the block interpolymers may have additional characteristics or properties. In one aspect, the interpolymers, preferably comprising ethylene and one or more co-polymerizable comonomers in polymerized form, are characterized by multiple blocks or segments of two or more polymerized monomer units differing in chemical or physical properties (blocked interpolymer), most preferably a multi-block copolymer, the block interpolymer having a molecular fraction which elutes between 40° C. and 130° C. when fractionated using TREF, characterized in that the fraction has a molar comonomer content higher, at least 5 percent higher in some embodiments, at least 10 percent higher in other embodiments, than that of a comparable random ethylene interpolymer fraction eluting between the same temperatures, wherein the comparable random ethylene interpolymer comprises the same comonomer(s), and has a melt index, density, and molar comonomer content (based on the whole polymer) within 10 percent of that of the blocked interpolymer. The Mw/Mn of the comparable interpolymer may also be within 10 percent of that of the blocked interpolymer and/or the comparable interpolymer may have total comonomer content within 10 weight percent of that of the blocked interpolymer.

Comonomer content may be measured using any suitable technique, with techniques based on nuclear magnetic resonance ("NMR") spectroscopy preferred. Moreover, for polymers or blends of polymers having relatively broad TREF curves, the polymer is first fractionated using TREF into fractions each having an eluted temperature range of 10° C. or less. That is, each eluted fraction has a collection temperature window of 10° C. or less. Using this technique, the block interpolymers have at least one such fraction having a higher molar comonomer content than a corresponding fraction of the comparable interpolymer.

In another aspect, the interpolymer is an olefin interpolymer, preferably comprising ethylene and one or more co-polymerizable comonomers in polymerized form, characterized by multiple blocks (i.e., at least two blocks) or segments of two or more polymerized monomer units differing in chemical or physical properties (blocked interpolymer), most preferably a multi-block copolymer, the block interpolymer having a peak (but not just a molecular fraction) which elutes between 40° C. and 130° C. (but without collecting and/or isolating individual fractions), characterized in that the peak, has a comonomer content estimated by infra-red spectroscopy when expanded using a full width/half maximum (FWHM) area calculation, has an average molar comonomer content higher, at least 5 percent higher in some embodiments, at least 10 percent higher in other embodiments, than that of a comparable random ethylene interpolymer peak at the same elution temperature and expanded using a full width/half maximum (FWHM) area calculation, wherein the comparable random ethylene interpolymer has the same comonomer(s) and has a melt index, density, and molar comonomer content (based on the whole polymer) within 10 percent of that of the blocked interpolymer. The Mw/Mn of the comparable interpolymer may also be within 10 percent of that of the blocked interpolymer and/or the comparable interpolymer may have a total comonomer content within 10 weight percent of that of the blocked interpolymer. The full width/half maximum (FWHM) calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between $T_1$ and $T_2$, where $T_1$ and $T_2$ are points determined, to the left and right of the ATREF peak, by dividing the peak height by two, and then drawing a line horizontal to the base line, that intersects the left and right portions of the ATREF curve. A calibration curve for comonomer content is made using random ethylene/α-olefin copolymers, plotting comonomer content from NMR versus FWHM area ratio of the TREF peak. For this infra-red method, the calibration curve is generated for the same comonomer type of interest. The comonomer content of TREF peak of the multi-block interpolymer may be determined by referencing this calibration curve using its FWHM methyl:methylene area ratio [$CH_3/CH_2$] of the TREF peak.

Comonomer content may be measured using any suitable technique, with techniques based on nuclear magnetic resonance (NMR) spectroscopy preferred. Using this technique, the blocked interpolymers have higher molar comonomer content than a corresponding comparable interpolymer.

In some embodiments, for interpolymers of ethylene and 1-octene, the block interpolymer may have a comonomer content of the TREF fraction eluting between 40 and 130° C. greater than or equal to the quantity (−0.2013)*T+20.07, where T is the numerical value of the peak elution temperature of the TREF fraction being compared, measured in ° C. The comonomer content of the TREF fraction eluting between 40 and 130° C. may be greater than or equal to the quantity (−0.2013)*T+21.07 in other embodiments In addition to the above aspects and properties described herein, the interpolymers may be characterized by one or more additional characteristics. In one aspect, the interpolymer is an olefin interpolymer, preferably comprising ethylene and one or more co-polymerizable comonomers in polymerized form, characterized by multiple blocks or segments of two or more polymerized monomer units differing in chemical or physical properties (blocked interpolymer), most preferably a multi-block copolymer, the block interpolymer having a molecular fraction which elutes between 40° C. and 130° C., when fractionated using TREF increments, characterized in that the fraction has a molar comonomer content higher, at least 5, 10, 15, 20 or 25 percent higher in various embodiments, than that of a comparable random ethylene interpolymer fraction eluting between the same temperatures, wherein the comparable random ethylene interpolymer comprises the same comonomer(s), preferably it is the same comonomer(s), and a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer.

In some embodiments, the above interpolymers may be interpolymers of ethylene and at least one α-olefin, especially those interpolymers having a whole polymer density from about 0.855 to about 0.935 g/cm$^3$. In other embodiments, for polymers having more than about 1 mole percent comonomer, the blocked interpolymer may have a comonomer content of the TREF fraction eluting between 40 and 130° C. greater than or equal to the quantity $(-0.1356)*T+13.89$, where T is the numerical value of the peak ATREF elution temperature of the TREF fraction being compared, measured in ° C. In other embodiments, the comonomer content of the TREF fraction eluting between 40 and 130° C. may be greater than or equal to the quantity $(-0.1356)*T+14.93$; and greater than or equal to the quantity $(-0.2013)*T+21.07$ in yet other embodiments.

In still another aspect, the interpolymer is an olefin interpolymer, preferably comprising ethylene and one or more co-polymerizable comonomers in polymerized form, characterized by multiple blocks or segments of two or more polymerized monomer units differing in chemical or physical properties (blocked interpolymer), most preferably a multi-block copolymer, the block interpolymer having a molecular fraction which elutes between 40° C. and 130° C., when fractionated using TREF increments, characterized in that every fraction having a comonomer content of at least about 6 mole percent, has a melting point greater than about 100° C. For those fractions having a comonomer content from about 3 mole percent to about 6 mole percent, every fraction has a DSC melting point of about 110° C. or higher. In other embodiments, the polymer fractions, having at least 1 mol percent comonomer, have a DSC melting point that corresponds to the equation:

$$Tm \geq (-5.5926)(\text{mol percent comonomer in the fraction}) + 135.90.$$

In yet another aspect, the interpolymer is an olefin interpolymer comprising ethylene and one or more co-polymerizable comonomers in polymerized form, characterized by multiple blocks or segments of two or more polymerized monomer units differing in chemical or physical properties (blocked interpolymer), most preferably a multi-block copolymer, the block interpolymer having a molecular fraction which elutes between 40° C. and 130° C., when fractionated using TREF increments, characterized in that every fraction that has an ATREF elution temperature greater than or equal to about 76° C., has a melt enthalpy (heat of fusion) as measured by DSC, corresponding to the equation:

$$\text{Heat of fusion (J/gm)} \leq (3.1718)(\text{ATREF elution temperature in ° C.}) - 136.58.$$

The multi-block interpolymers may have a molecular fraction which elutes between 40° C. and 130° C., when fractionated using TREF increments, characterized in that every fraction that has an ATREF elution temperature between 40° C. and less than about 76° C., has a melt enthalpy (heat of fusion) as measured by DSC, corresponding to the equation:

$$\text{Heat of fusion (J/gm)} \leq (1.1312)(\text{ATREF elution temperature in ° C.}) + 22.97.$$

For copolymers of ethylene and an α-olefin, the multi-block interpolymers possess a PDI of at least 1.3 in some embodiments; at least 1.5 in other embodiments; at least 1.7 in other embodiments; at least 2.0 in other embodiments; and at least 2.6 in yet other embodiments. In other embodiments, the multi-block interpolymers possess a PDI up to a maximum value of 5.0; up to a maximum of 3.5 in other embodiments; and up to a maximum of 2.7 in yet other embodiments. In some embodiments, the multi-block interpolymers may have a heat of fusion of 80 J/g or less. In other embodiments, the multi-block interpolymers may have an ethylene content of at least 50 weight percent. In some embodiments, the multi-block interpolymer may have a glass transition temperature, $T_g$, of less than −25° C.; less than −30° C. in other embodiments. In other embodiments, the multi-block interpolymer may have one and only one $T_m$. In other embodiments, the multi-block interpolymers may possess a combination of the above properties.

Further, the multi-block interpolymers may have, alone or in combination with any other properties disclosed herein, a storage modulus, G', such that log (G') is greater than or equal to 400 kPa at a temperature of 100° C.; and greater than or equal to 1.0 MPa at a temperature of 100° C. in other embodiments. Moreover, the interpolymers may possess a relatively flat storage modulus as a function of temperature in the range from 0 to 100° C. The term "relatively flat" in this context indicates that log G' (Pa) decreases by less than one order of magnitude between 50 and 100° C., preferably between 0 and 100° C.

The interpolymers may be further characterized by a thermomechanical analysis penetration depth of 1 mm at a temperature of at least 90° C. as well as a flexural modulus of from 3 kpsi (20 MPa) to 13 kpsi (90 MPa). Alternatively, the interpolymers may have a thermomechanical analysis penetration depth of 1 mm at a temperature of at least 104° C. as well as a flexural modulus of at least 3 kpsi (20 MPa). They may be characterized as having an abrasion resistance (or volume loss) of less than 90 mm$^3$.

Additionally, the ethylene/α-olefin interpolymers may have a melt index, $I_2$, from 0.01 to 2000 g/10 minutes in some embodiments; from 0.01 to 1000 g/10 minutes in other embodiments; from 0.01 to 500 g/10 minutes in other embodiments; and from 0.01 to 100 g/10 minutes in yet other embodiments. In certain embodiments, the ethylene/α-olefin interpolymers may have a melt index, $I_2$, from 0.01 to 10 g/10 minutes, from 0.5 to 50 g/10 minutes, from 1 to 30 g/10 minutes, from 1 to 6 g/10 minutes or from 0.3 to 10 g/10 minutes. In certain embodiments, the melt index for the ethylene/α-olefin polymers may be approximately 1 g/10 minutes, 3 g/10 minutes or 5 g/10 minutes.

The interpolymers may have molecular weights, $M_w$, from 1,000 g/mole to 5,000,000 g/mole in some embodiments; from 1000 g/mole to 1,000,000 in other embodiments; from 10,000 g/mole to 500,000 g/mole in other embodiments; and from 10,000 g/mole to 300,000 g/mole in yet other embodiments. The density of the multi-block interpolymers may be from 0.80 to 0.99 g/cm$^3$ in some embodiments; for ethylene containing polymers from 0.85 g/cm$^3$ to 0.97 g/cm$^3$. In certain embodiments, the density of the ethylene/α-olefin polymers may range from 0.860 to 0.925 g/cm$^3$ or 0.867 to 0.910 g/cm$^3$.

The process of making the polymers has been disclosed in the following patent applications: U.S. Provisional Application No. 60/553,906, filed Mar. 17, 2004; U.S. Provisional Application No. 60/662,937, filed Mar. 17, 2005; U.S. Provisional Application. No. 60/662,939, filed Mar. 17, 2005; U.S. Provisional Application No. 60/662,938, filed Mar. 17, 2005; PCT Publication No. WO2005/90425, filed Mar. 17, 2005; PCT Publication No. WO2005/90427, filed Mar. 17, 2005; and PCT Application No. PCT/US2005/008917, filed Mar. 17, 2005, all of which are incorporated by reference herein in their entirety. For example, one such method comprises contacting ethylene and optionally one or more addition polymerizable monomers other than ethylene under addition polymerization conditions with a catalyst composition comprising:

the admixture or reaction product resulting from combining:

(A) a first olefin polymerization catalyst having a high comonomer incorporation index, (B) a second olefin polymerization catalyst having a comonomer incorporation index less than 90 percent, preferably less than 50 percent, most preferably less than 5 percent of the comonomer incorporation index of catalyst (A), and (C) a chain shuttling agent.

Representative catalysts and chain shuttling agent are as follows.

Catalyst (A1) is [N-(2,6-di(1-methylethyl)phenyl)amido) (2-isopropylphenyl)((α-naphthalen-2-diyl(6-pyridin-2-diyl) methane)]hafnium dimethyl, prepared according to the teachings of WO 03/40195, U.S. Pat. No. 6,953,764 and No. 6,960,635, and WO 04/24740:

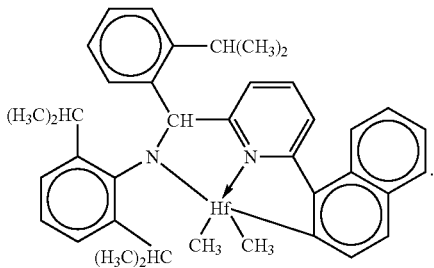

Catalyst (A2) is [N-(2,6-di(1-methylethyl)phenyl)amido) (2-methylphenyl)(1,2-phenylene-(6-pyridin-2-diyl)methane)]hafnium dimethyl, prepared according to the teachings of WO 03/40195, U.S. Pat. Nos. 6,953,764 and 6,960,635, and WO 04/24740:

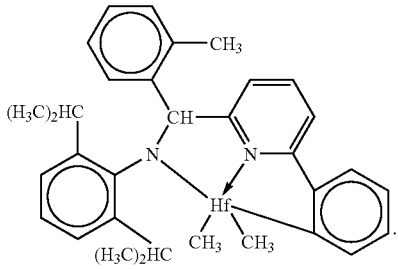

Catalyst (A3) is bis[N,N'''-(2,4,6-tri(methylphenyl)amido) ethylenediamine]hafnium dibenzyl:

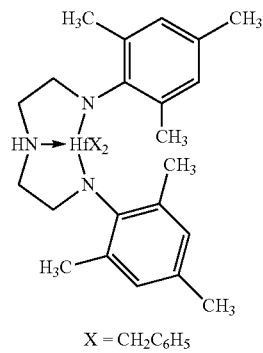

X = CH₂C₆H₅

Catalyst (A4) is bis((2-oxoyl-3-(dibenzo-1H-pyrrole-1-yl)-5-(methyl)phenyl)-2-phenoxymethyl)cyclohexane-1,2-diyl zirconium (IV) dibenzyl, prepared substantially according to the teachings of U.S. Pat. No. 6,897,276.

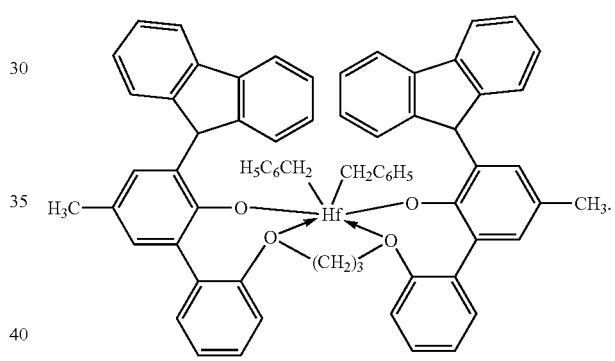

Catalyst (B1) is 1,2-bis-(3,5-di-t-butylphenylene)(1-(N-(1-methylethyl)immino)methyl)(2-oxoyl) zirconium dibenzyl:

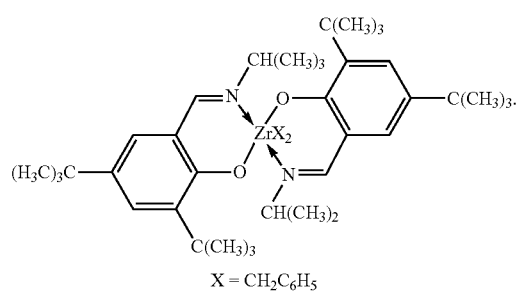

X = CH₂C₆H₅

Catalyst (B2) is 1,2-bis-(3,5-di-t-butylphenylene)(1-(N-(2-methylcyclohexyl)-immino)methyl)(2-oxoyl) zirconium dibenzyl:

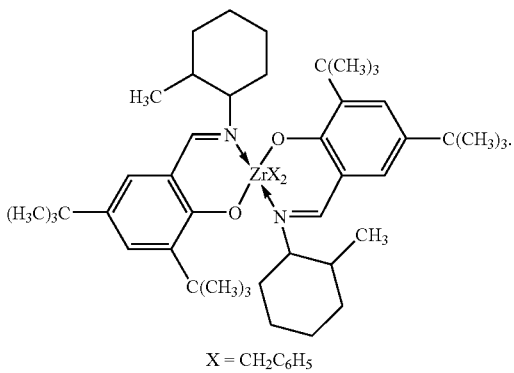

Catalyst (C1) is (t-butylamido)dimethyl(3-N-pyrrolyl-1,2,3,3a,7a-η-inden-1-yl)silanetitanium dimethyl prepared substantially according to the techniques of U.S. Pat. No. 6,268,444:

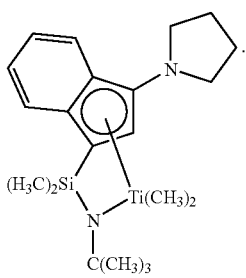

Catalyst (C2) is (t-butylamido)di(4-methylphenyl)(2-methyl-1,2,3,3a,7a-η-inden-1-yl)silanetitanium dimethyl prepared substantially according to the teachings of U.S. Pat. No. 6,825,295:

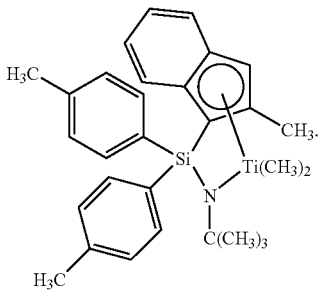

Catalyst (C3) is (t-butylamido)di(4-methylphenyl)(2-methyl-1,2,3,3a,8a-η-s-indacen-1-yl)silanetitanium dimethyl prepared substantially according to the teachings of U.S. Pat. No. 6,825,295:

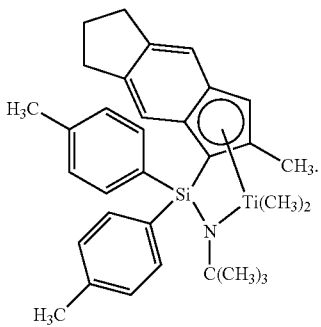

Catalyst (D1) is bis(dimethyldisiloxane)(indene-1-yl)zirconium dichloride available from Sigma-Aldrich:

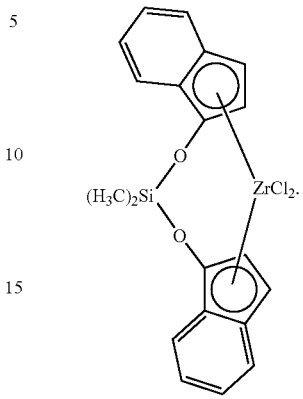

Shuttling agents may include diethylzinc, di(i-butyl)zinc, di(n-hexyl)zinc, triethylaluminum, trioctylaluminum, triethylgallium, i-butylaluminum bis(dimethyl(t-butyl)siloxane), i-butylaluminum bis(di(trimethylsilyl)amide), n-octylaluminum di(pyridine-2-methoxide), bis(n-octadecyl)i-butylaluminum, i-butylaluminum bis(di(n-pentyl)amide), n-octylaluminum bis(2,6-di-t-butylphenoxide, n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc(2,6-diphenylphenoxide), and ethylzinc (t-butoxide).

The foregoing process may take the form of a continuous solution process for forming block copolymers, especially multi-block copolymers, preferably linear multi-block copolymers of two or more monomers, more especially ethylene and a $C_{3-20}$ olefin or cycloolefin, and most especially ethylene and a $C_{4-20}$ α-olefin, using multiple catalysts that are incapable of interconversion. That is, the catalysts are chemically distinct. Under continuous solution polymerization conditions, the process is ideally suited for polymerization of mixtures of monomers at high monomer conversions. Under these polymerization conditions, shuttling from the chain shuttling agent to the catalyst becomes advantaged compared to chain growth, and multi-block copolymers, especially linear multi-block copolymers are formed in high efficiency.

The interpolymers disclosed herein may be differentiated from conventional, random copolymers, physical blends of polymers, and block copolymers prepared via sequential monomer addition, fluxional catalysts, and anionic or cationic living polymerization techniques. In particular, compared to a random copolymer of the same monomers and monomer content at equivalent crystallinity or modulus, the interpolymers have better (higher) heat resistance as measured by melting point, higher TMA penetration temperature, higher high-temperature tensile strength, and/or higher high-temperature torsion storage modulus as determined by dynamic mechanical analysis. Compared to a random copolymer containing the same monomers and monomer content, the interpolymers have lower compression set, particularly at elevated temperatures, lower stress relaxation, higher creep resistance, higher tear strength, higher blocking resistance, faster setup due to higher crystallization (solidification) temperature, higher recovery (particularly at elevated temperatures), better abrasion resistance, higher retractive force, and better oil and filler acceptance.

The interpolymers may also exhibit a unique crystallization and branching distribution relationship. That is, the interpolymers have a relatively large difference between the tallest peak temperature measured using CRYSTAF and DSC as a function of heat of fusion, especially as compared to random copolymers containing the same monomers and monomer level or physical blends of polymers, such as a blend of a high density polymer and a lower density copolymer, at equivalent overall density. It is believed that this unique feature of the interpolymers is due to the unique distribution of the comonomer in blocks within the polymer backbone. In particular, the interpolymers may comprise alternating blocks of differing comonomer content (including homopolymer blocks). The interpolymers may also comprise a distribution in number and/or block size of polymer blocks of differing density or comonomer content, which is a Schultz-Flory type of distribution. In addition, the interpolymers also have a unique peak melting point and crystallization temperature profile that is substantially independent of polymer density, modulus, and morphology. In some embodiments, the microcrystalline order of the polymers demonstrates characteristic spherulites and lamellae that are distinguishable from random or block copolymers, even at PDI values that are less than 1.7, or even less than 1.5, down to less than 1.3.

Moreover, the interpolymers may be prepared using techniques to influence the degree or level of blockiness. That is the amount of comonomer and length of each polymer block or segment may be altered by controlling the ratio and type of catalysts and shuttling agent as well as the temperature of the polymerization, and other polymerization variables. A surprising benefit of this phenomenon is the discovery that as the degree of blockiness is increased, the optical properties, tear strength, and high temperature recovery properties of the resulting polymer are improved. In particular, haze decreases while clarity, tear strength, and high temperature recovery properties increase as the average number of blocks in the polymer increases. By selecting shuttling agents and catalyst combinations having the desired chain transferring ability (high rates of shuttling with low levels of chain termination) other forms of polymer termination are effectively suppressed. Accordingly, little if any β-hydride elimination is observed in the polymerization of ethylene/α-olefin comonomer mixtures, and the resulting crystalline blocks are highly, or substantially completely, linear, possessing little or no long chain branching.

Polymers with highly crystalline chain ends may be selectively prepared. In elastomer applications, reducing the relative quantity of polymer that terminates with an amorphous block reduces the intermolecular dilutive effect on crystalline regions. This result may be obtained by choosing chain shuttling agents and catalysts having an appropriate response to hydrogen or other chain terminating agents. Specifically, if the catalyst which produces highly crystalline polymer is more susceptible to chain termination (such as by use of hydrogen) than the catalyst responsible for producing the less crystalline polymer segment (such as through higher comonomer incorporation, regio-error, or atactic polymer formation), then the highly crystalline polymer segments will preferentially populate the terminal portions of the polymer. Not only are the resulting terminated groups crystalline, but upon termination, the highly crystalline polymer forming catalyst site is once again available for re-initiation of polymer formation. The initially formed polymer is therefore another highly crystalline polymer segment. Accordingly, both ends of the resulting multi-block copolymer are preferentially highly crystalline.

The ethylene α-olefin interpolymers used in the embodiments of the invention may be interpolymers of ethylene with at least one $C_3$-$C_{20}$ α-olefin. The interpolymers may further comprise $C_4$-$C_{18}$ diolefin and/or alkenylbenzene. Suitable unsaturated comonomers useful for polymerizing with ethylene include, for example, ethylenically unsaturated monomers, conjugated or non-conjugated dienes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. 1-Butene and 1-octene are especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

Other ethylene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Suitable olefins include $C_3$-$C_{20}$ aliphatic and aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_1$-$C_{20}$ hydrocarbyl or cyclohydrocarbyl groups. Also included are mixtures of such olefins as well as mixtures of such olefins with $C_4$-$C_{40}$ diolefin compounds.

Examples of olefin monomers include, but are not limited to propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_4$-$C_{40}$ dienes, including but not limited to 1,3-butadiene, 1,3-pentadiene, 1,4-hexadiene, 1,5-hexadiene, 1,7-octadiene, 1,9-decadiene, other $C_4$-$C_{40}$ α-olefins, and the like. In certain embodiments, the α-olefin is propylene, 1-butene, 1-pentene, 1-hexene, 1-octene or a combination thereof. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

Other olefin interpolymers include polymers comprising monovinylidene aromatic monomers including styrene, o-methyl styrene, p-methyl styrene, t-butylstyrene, and the like. In particular, interpolymers comprising ethylene and styrene may be used. In other embodiments, copolymers comprising ethylene, styrene and a $C_3$-$C_{20}$ α olefin, optionally comprising a $C_4$-$C_{20}$ diene, may be used.

Suitable non-conjugated diene monomers may include straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD).

One class of desirable polymers that may be used in accordance with embodiments of the invention includes elastomeric interpolymers of ethylene, a $C_3$-$C_{20}$ α-olefin, especially propylene, and optionally one or more diene monomers. Preferred α-olefins for use in this embodiment are designated by the formula $CH_2$=CHR*, where R* is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butyl-idene-2-norbornene. A particularly preferred diene is 5-ethylidene-2-norbornene.

Because the diene-containing polymers comprise alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer may be better controlled. Such crosslinkable elastomers and the cured products have advantaged properties, including higher tensile strength and better elastic recovery.

In some embodiments, the interpolymers made with two catalysts incorporating differing quantities of comonomer have a weight ratio of blocks formed thereby ranging from 95:5 to 5:95. The elastomeric interpolymers, in some embodiments, have an ethylene content of from 20 to 90 percent, a diene content of from 0.1 to 10 percent, and an α-olefin content of from 10 to 80 percent, based on the total weight of the polymer. In other embodiments, the multi-block elastomeric polymers have an ethylene content of from 60 to 90 percent, a diene content of from 0.1 to 10 percent, and an α-olefin content of from 10 to 40 percent, based on the total weight of the polymer. In some embodiments, the interpolymers are high molecular weight polymers, having a weight average molecular weight (Mw) from 10,000 to about 2,500,000; from 20,000 to 500,000 in other embodiments; and from 20,000 to 350,000 in yet other embodiments. In some embodiments, the interpolymers may have a polydispersity less than 3.5; less than 3.0 in other embodiments. In other embodiments, the interpolymer may have a Mooney viscosity (ML (1+4) 125° C.) ranging from 1 to 250. In other embodiments, such polymers may have an ethylene content from 65 to 75 percent, a diene content from 0 to 6 percent, and an α-olefin content from 20 to 35 percent.

The ethylene/α-olefin interpolymers may be functionalized by incorporating at least one functional group in its polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to an ethylene/α-olefin interpolymer, or it may be copolymerized with ethylene and an optional additional comonomer to form an interpolymer of ethylene, the functional comonomer and optionally other comonomer(s). Means for grafting functional groups onto polyethylene are described for example in U.S. Pat. Nos. 4,762,890, 4,927,888, and 4,950,541, the disclosures of these patents are incorporated herein by reference in their entirety. One particularly useful functional group is maleic anhydride.

The amount of the functional group present in the functional interpolymer may vary. The functional group may be present in a copolymer-type functionalized interpolymer in an amount of at least about 1.0 weight percent in some embodiments; at least about 5 weight percent in other embodiments; and at least about 7 weight percent in yet other embodiments. The functional group may be present in a copolymer-type functionalized interpolymer in an amount less than about 40 weight percent in some embodiments; less than about 30 weight percent in other embodiments; and less than about 25 weight percent in yet other embodiments.

Additives

Additives may be used with the base polymer, stabilizing agent, or filler used in the dispersion without deviating from the scope of the present invention. For example, additives may include a wetting agent, surfactants, anti-static agents, antifoam agent, anti block, wax-dispersion pigments, a neutralizing agent, a thickener, a compatibilizer, a brightener, a rheology modifier, a biocide, a fungicide, and other additives known to those skilled in the art.

Additives and adjuvants may be included in any formulation comprising the multi-block interpolymers. Suitable additives include fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils; and other natural and synthetic polymers, including other polymers according to embodiments of the invention.

Suitable polymers for blending with the polymers according to embodiments of the invention include thermoplastic and non-thermoplastic polymers including natural and synthetic polymers. Exemplary polymers for blending include polypropylene, (both impact modifying polypropylene, isotactic polypropylene, atactic polypropylene, and random ethylene/propylene copolymers), various types of polyethylene, including high pressure, free-radical LDPE, Ziegler Natta LLDPE, metallocene PE, including multiple reactor PE ("in reactor" blends of Ziegler-Natta PE and metallocene PE, such as products disclosed in U.S. Pat. Nos. 6,545,088, 6,538,070, 6,566,446, 5,844,045, 5,869,575, and 6,448,341, ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Homogeneous polymers such as olefin plastomers and elastomers, ethylene and propylene-based copolymers (for example polymers available under the trade designation VERSIFY™ available from The Dow Chemical Company and VISTAMAXX™ available from ExxonMobil may also be useful as components in blends comprising the multi-block interpolymers.

Suitable conventional block copolymers which may be blended with the interpolymers disclosed herein may possess a Mooney viscosity (ML 1+4@ 100° C.) in the range from 10 to 135 in some embodiments; from 25 to 100 in other embodiments; and from 30 to 80 in yet other embodiments. Suitable polyolefins especially include linear or low density polyethylene, polypropylene (including atactic, isotactic, syndiotactic and impact modified versions thereof) and poly(4-methyl-1-pentene). Suitable styrenic polymers include polystyrene, rubber modified polystyrene (HIPS), styrene/acrylonitrile copolymers (SAN), rubber modified SAN (ABS or AES) and styrene maleic anhydride copolymers.

The blends may be prepared by mixing or kneading the respective components at a temperature around or above the melt point temperature of one or both of the components. For most multiblock copolymers, this temperature may be above 130° C., most generally above 145° C., and most preferably above 150° C. Typical polymer mixing or kneading equipment that is capable of reaching the desired temperatures and melt plastifying the mixture may be employed. These include mills, kneaders, extruders (both single screw and twin-screw), BANBURY® mixers, calenders, and the like. The sequence of mixing and method may depend on the final composition. A combination of BANBURY® batch mixers and continuous mixers may also be employed, such as a BANBURY® mixer followed by a mill mixer followed by an extruder. Typically, a TPE or TPV composition will have a higher loading of cross-linkable polymer (typically the conventional block copolymer containing unsaturation) compared to TPO compositions. Generally, for TPE and TPV compositions, the weight ratio of block copolymer to multi-block copolymer may range from about 90:10 to 10:90, more preferably from 80:20 to 20:80, and most preferably from 75:25 to 25:75. For TPO applications, the weight ratio of multi-block copolymer to polyolefin may be from about 49:51 to about 5:95, more preferably from 35:65 to about 10:90. For modified styrenic polymer applications, the weight ratio of multi-block copolymer to polyolefin may also be from about 49:51 to about 5:95, more preferably from 35:65 to about 10:90. The ratios may be changed by changing the viscosity ratios of the various components. There is considerable literature illustrating techniques for changing the phase continuity by changing the viscosity ratios of the constituents of a blend and a person skilled in this art may consult if necessary.

The blend compositions may contain processing oils, plasticizers, and processing aids. Rubber processing oils having a certain ASTM designation and paraffinic, napthenic or aromatic process oils are all suitable for use. Generally from 0 to 150 parts, more preferably 0 to 100 parts, and most preferably from 0 to 50 parts of oil per 100 parts of total polymer are employed. Higher amounts of oil may tend to improve the processing of the resulting product at the expense of some physical properties. Additional processing aids include conventional waxes, fatty acid salts, such as calcium stearate or zinc stearate, (poly)alcohols including glycols, (poly)alcohol ethers, including glycol ethers, (poly)esters, including (poly) glycol esters, and metal salt-, especially-Group 1 or 2 metal or zinc-, salt derivatives thereof.

It is known that non-hydrogenated rubbers such as those comprising polymerized forms of butadiene or isoprene, including block copolymers (here-in-after diene rubbers), have lower resistance to UV, ozone, and oxidation, compared to mostly or highly saturated rubbers. In applications such as tires made from compositions containing higher concentrations of diene based rubbers, it is known to incorporate carbon black to improve rubber stability, along with anti-ozone additives and anti-oxidants. Multi-block copolymers according to the present invention possessing extremely low levels of unsaturation, find particular application as a protective surface layer (coated, coextruded or laminated) or weather resistant film adhered to articles formed from conventional diene elastomer modified polymeric compositions.

For conventional TPO, TPV, and TPE applications, carbon black is the additive of choice for UV absorption and stabilizing properties. Representative examples of carbon blacks include ASTM N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and average pore volumes ranging from 10 to 150 cm$^3$/100 g. Generally, smaller particle sized carbon blacks are employed, to the extent cost considerations permit. For many such applications the present multi-block copolymers and blends thereof require little or no carbon black, thereby allowing considerable design freedom to include alternative pigments or no pigments at all.

Compositions, including thermoplastic blends according to embodiments of the invention may also contain anti-ozonants or anti-oxidants that are known to a rubber chemist of ordinary skill. The anti-ozonants may be physical protectants such as waxy materials that come to the surface and protect the part from oxygen or ozone or they may be chemical protectors that react with oxygen or ozone. Suitable chemical protectors include styrenated phenols, butylated octylated phenol, butylated di(dimethylbenzyl) phenol, p-phenylenediamines, butylated reaction products of p-cresol and dicyclopentadiene (DCPD), polyphenolic anitioxidants, hydroquinone derivatives, quinoline, diphenylene antioxidants, thioester antioxidants, and blends thereof. Some representative trade names of such products are WINGSTAY™ S antioxidant, POLYSTAY™ 100 antioxidant, POLYSTAY™ 100 AZ antioxidant, POLYSTAY™ 200 antioxidant, WINGSTAY™ L antioxidant, WINGSTAY™ LHLS antioxidant, WINGSTAY™ K antioxidant, WINGSTAY™ 29 antioxidant, WINGSTAY™ SN-1 antioxidant, and IRGANOX™ antioxidants. In some applications, the anti-oxidants and anti-ozonants used will preferably be non-staining and non-migratory.

For providing additional stability against UV radiation, hindered amine light stabilizers (HALS) and UV absorbers may be also used. Suitable examples include TINUVIN™ 123, TINUVIN™ 144, TINUVIN™ 622, TINUVIN™ 765, TINUVIN™ 770, and TINUVIN™ 780, available from Ciba Specialty Chemicals, and CHEMISORB™ T944, available from Cytex Plastics, Houston Tex. USA. A Lewis acid may be additionally included with a HALS compound in order to achieve superior surface quality, as disclosed in U.S. Pat. No. 6,051,681.

For some compositions, additional mixing process may be employed to pre-disperse the anti-oxidants, anti-ozonants, carbon black, UV absorbers, and/or light stabilizers to form a masterbatch, and subsequently to form polymer blends there from.

Suitable crosslinking agents (also referred to as curing or vulcanizing agents) for use herein include sulfur based, peroxide based, or phenolic based compounds.

Examples of the foregoing materials are found in the art, including in U.S. Pat. Nos. 3,758,643, 3,806,558, 5,051,478, 4,104,210, 4,130,535, 4,202,801, 4,271,049, 4,340,684, 4,250,273, 4,927,882, 4,311,628 and 5,248,729.

When sulfur based curing agents are employed, accelerators and cure activators may be used as well. Accelerators are used to control the time and/or temperature required for dynamic vulcanization and to improve the properties of the resulting cross-linked article. In one embodiment, a single accelerator or primary accelerator is used. The primary accelerator(s) may be used in total amounts ranging from about 0.5 to about 4, preferably about 0.8 to about 1.5 phr, based on total composition weight. In another embodiment, combinations of a primary and a secondary accelerator might be used with the secondary accelerator being used in smaller amounts, such as from about 0.05 to about 3 phr, in order to activate and to improve the properties of the cured article. Combinations of accelerators generally produce articles having properties that are somewhat better than those produced by use of a single accelerator. In addition, delayed action accelerators may be used which are not affected by normal processing temperatures yet produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. Certain processing aids and cure activators such as stearic acid and ZnO may also be used. When peroxide based curing agents are used, co-activators or coagents may be used in combination therewith. Suitable coagents include trimethylolpropane triacrylate (TMPTA), trimethylolpropane trimethacrylate (TMPTMA), triallyl cyanurate (TAC), triallyl isocyanurate (TAIC), among others. Use of peroxide crosslinkers and optional coagents used for partial or complete dynamic vulcanization are known in the art and disclosed for example in the publication, "Peroxide Vulcanization of Elastomer," Vol. 74, No 3, July-August 2001.

When the multi-block copolymer containing composition is at least partially crosslinked, the degree of crosslinking may be measured by dissolving the composition in a solvent for specified duration, and calculating the percent gel or unextractable component. The percent gel normally increases with increasing crosslinking levels. For cured articles according to embodiments of the invention, the percent gel content is desirably in the range from 5 to 100 percent.

The multi-block copolymers according to embodiments of the invention as well as blends thereof may possess improved processability compared to prior art compositions, due, it is believed, to lower melt viscosity. Thus, the composition or blend demonstrates an improved surface appearance, especially when formed into a molded or extruded article. At the same time, the present compositions and blends thereof uniquely possess improved melt strength properties, thereby allowing the present multi-block copolymers and blends thereof, especially TPO blends, to be usefully employed in foam and thermoforming applications where melt strength is currently inadequate.

Thermoplastic compositions according to embodiments of the invention may also contain organic or inorganic fillers or other additives such as starch, talc, calcium carbonate, glass fibers, polymeric fibers (including nylon, rayon, cotton, polyester, and polyaramide), metal fibers, flakes or particles, expandable layered silicates, phosphates or carbonates, such as clays, mica, silica, alumina, aluminosilicates or aluminophosphates, carbon whiskers, carbon fibers, nanoparticles including nanotubes, wollastonite, graphite, zeolites, and ceramics, such as silicon carbide, silicon nitride or titania. Silane based or other coupling agents may also be employed for better filler bonding.

The thermoplastic compositions according to embodiments of the invention, including the foregoing blends, may be processed by conventional molding techniques such as injection molding, extrusion molding, thermoforming, slush molding, over molding, insert molding, blow molding, and other techniques. Films, including multi-layer films, may be produced by cast or tentering processes, including blown film processes.

In addition to the above, the block ethylene/α-olefin interpolymers also may be used in a manner that is described in the following U.S. provisional applications, the disclosures of which and their continuations, divisional applications and continuation-in-part applications are incorporated by reference herein in their entirety:

1) "Impact-Modification of Thermoplastics with Ethylene/α-Olefins," U.S. Patent Application Publication No. 20070010616;
2) "Three Dimensional Random Looped Structures Made from Interpolymers of Ethylene/α-Olefins and Uses Thereof," U.S. Patent Application Publication No. 20060198983;
3) "Polymer Blends from Interpolymer of Ethylene/α-Olefin," U.S. Patent Application Publication No. 2006019906;
4) "Viscosity Index Improver for Lubricant Compositions," U.S. Patent Application Publication No. 20060199896;
5) "Fibers Made from Copolymers of Ethylene/α-Olefins," U.S. Patent Application Publication No. 20060199931;
6) "Fibers Made from Copolymers of Propylene/α-Olefins," U.S. Patent Application Publication No. 20060199006;
7) "Adhesive and Marking Compositions Made from Interpolymers of Ethylene/α-Olefins," U.S. Patent Application Publication No. 20060199897;
8) "Compositions of Ethylene/α-Olefin Multi-Block Interpolymers Suitable For Films," U.S. Patent Application Publication No. 20060199912;
9) "Rheology Modification of Interpolymers of Ethylene/α-Olefins and Articles Made Therefrom," U.S. Patent Application Publication No. 20060199908;
10) "Soft Foams Made From Interpolymers of Ethylene/α-Olefins," U.S. Patent Application Publication No. 20060205833;
11) "Low Molecular Weight Ethylene/α-Olefin Interpolymer as Base Lubricant Oil," U.S. Patent Application Serial No. 20060199744;
12) "Foams Made From Interpolymers of Ethylene/α-Olefins," U.S. Patent Application Publication No. 20060199872;
13) "Compositions of Ethylene/α-Olefin Multi-Block Interpolymer For Blown Films with High Hot Tack," U.S. Ser. No. 60/717,982, filed on Sep. 16, 2005;
14) "Cap Liners, Closures and Gaskets From Multi-Block Polymers," U.S. Patent Application Publication No. 20060199911;
15) "Polymer Blends From Interpolymers of Ethylene/α-Olefins," U.S. Patent Application Publication No. 20060211819;
16) "Anti-Blocking Compositions Comprising Interpolymers of Ethylene/α-Olefins," U.S. Patent Application Publication No. 20060199884;

17) "Interpolymers of Ethylene/α-Olefins Blends and Profiles and Gaskets Made Therefrom," U.S. Patent Application Publication No. 20060199905;
18) "Filled Polymer Compositions Made from Interpolymers of Ethylene/α-Olefins and Uses Thereof," U.S. Patent Application Publication No. 20060199887;
19) "Compositions Of Ethylene/α-Olefin Multi-Block Interpolymer For Elastic Films and Laminates," U.S. Patent Application Publication No. 20070078222;
20) "Thermoplastic Vulcanizate Comprising Interpolymers of Ethylene/α-Olefins," U.S. Patent Application Publication No. 20060199910;
21) "Multi-Layer, Elastic Articles," U.S. Patent Application Publication No. 20070092704; and
22) "Functionalized Olefin Interpolymers, Compositions and Articles Prepared Therefrom, and Methods for Making the Same," U.S. Patent Application Publication No. 20060199914.

Stabilizing Agent

Embodiments of the present invention use a stabilizing agent to promote the formation of a stable dispersion or emulsion. In selected embodiments, the stabilizing agent may be a surfactant, a polymer (different from the base polymer detailed above), or mixtures thereof. In certain embodiments, the polymer may be a polar polymer, having a polar group as either a comonomer or grafted monomer. In preferred embodiments, the stabilizing agent comprises one or more polar polyolefins, having a polar group as either a comonomer or grafted monomer. Typical polymers include ethylene-acrylic acid (EAA) and ethylene-methacrylic acid copolymers, such as those available under the trademarks PRIMACOR™ (trademark of The Dow Chemical Company), NUCREL™ (trademark of E.I. DuPont de Nemours), and ESCOR™ (trademark of ExxonMobil) and described in U.S. Pat. Nos. 4,599,392, 4,988,781, and 5,938,437, each of which is incorporated herein by reference in its entirety. Other polymers include ethylene ethyl acrylate (EEA) copolymer, ethylene methyl methacrylate (EMMA), and ethylene butyl acrylate (EBA). Other ethylene-carboxylic acid copolymer may also be used. Those having ordinary skill in the art will recognize that a number of other useful polymers may also be used.

Other surfactants that may be used include long chain fatty acids or fatty acid salts having from 12 to 60 carbon atoms. In other embodiments, the long chain fatty acid or fatty acid salt may have from 12 to 40 carbon atoms.

If the polar group of the polymer is acidic or basic in nature, the stabilizing polymer may be partially or fully neutralized with a neutralizing agent to form the corresponding salt. In certain embodiments, neutralization of the stabilizing agent, such as a long chain fatty acid or EAA, may be from 25 to 200% on a molar basis; from 50 to 110% on a molar basis in other embodiments. For example, for EAA, the neutralizing agent is a base, such as ammonium hydroxide or potassium hydroxide, for example. Other neutralizing agents may include lithium hydroxide or sodium hydroxide, for example. Those having ordinary skill in the art will appreciate that the selection of an appropriate neutralizing agent depends on the specific composition formulated, and that such a choice is within the knowledge of those of ordinary skill in the art.

Additional surfactants that may be useful in the practice of the present invention include cationic surfactants, anionic surfactants, or a non-ionic surfactants. Examples of anionic surfactants include sulfonates, carboxylates, and phosphates. Examples of cationic surfactants include quaternary amines. Examples of non-ionic surfactants include block copolymers containing ethylene oxide and silicone surfactants. Surfactants useful in the practice of the present invention may be either external surfactants or internal surfactants. External surfactants are surfactants that do not become chemically reacted into the polymer during dispersion preparation. Examples of external surfactants useful herein include salts of dodecyl benzene sulfonic acid and lauryl sulfonic acid salt. Internal surfactants are surfactants that do become chemically reacted into the polymer during dispersion preparation. An example of an internal surfactant useful herein includes 2,2-dimethylol propionic acid and its salts.

In particular embodiments, the dispersing agent or stabilizing agent may be used in an amount ranging from greater than zero to about 60% by weight based on the amount of base polymer (or base polymer mixture) used. For example, long chain fatty acids or salts thereof may be used in an amount ranging from 0.5 to 10% by weight based on the amount of base polymer. In other embodiments, ethylene-acrylic acid or ethylene-methacrylic acid copolymers may be used in an amount from 0.5 to 60% by weight based on polymer. In yet other embodiments, sulfonic acid salts may be used in an amount from 0.5 to 10% by weight based on the amount of base polymer.

The type and amount of stabilizing agent used may also affect end properties of the cellulose-based article formed incorporating the dispersion. For example, articles having improved oil and grease resistance might incorporate a surfactant package having ethylene-acrylic acid copolymers or ethylene-methacrylic acid copolymers in an amount from about 10 to about 50% by weight based on the total amount of base polymer. A similar surfactant package may be used when improved strength or softness is a desired end property. As another example, articles having improved water or moisture resistance might incorporate a surfactant package utilizing long chain fatty acids in an amount from 0.5 to 5%, or ethylene-acrylic acid copolymers in an amount from 10 to 50%, both by weight based on the total amount of base polymer. In other embodiments, the minimum amount of surfactant or stabilizing agent must be at least 1% by weight based on the total amount of base polymer.

Fillers

Embodiments of the dispersions disclosed herein may include a filler as part of the composition. A suitable filler loading in a polyolefin dispersion may be from about 0 to about 600 parts of filler per hundred parts of polyolefin. In certain embodiments, the filler loading in the dispersion may be from about 0 to about 200 parts of filler per hundred parts of a combined amount of the polyolefin and the polymeric stabilizing agent. The filler material may include conventional fillers such as milled glass, calcium carbonate, aluminum trihydrate, talc, antimony trioxide, fly ash, clays (such as bentonite or kaolin clays for example), or other known fillers.

Thermoplastic Polyolefin

As mentioned above, the dispersions disclosed herein may include blends of the above described multi-block olefin interpolymers with thermoplastic polymers or non-polar thermoplastic polyolefins. In some embodiments, the multi-block interpolymer may be the majority polymeric component. In other embodiments, the thermoplastic polyolefin may be the majority polymeric component.

In specific embodiments, the thermoplastic polymers or non-polar thermoplastic polyolefins may include polyolefins such as polypropylene, polyethylene, and copolymers thereof, and blends thereof, as well as ethylene-propylene-diene terpolymers. In some embodiments, preferred olefinic polymers include homogeneous polymers described in U.S. Pat. No. 3,645,992; high density polyethylene (HDPE) as described in U.S. Pat. No. 4,076,698; heterogeneously branched linear low density polyethylene (LLDPE); heterogeneously branched ultra low linear density polyethylene (ULDPE); homogeneously branched, linear ethylene/α-olefin copolymers; homogeneously branched, substantially linear ethylene/α-olefin polymers, which may be prepared, for example, by a process disclosed in U.S. Pat. Nos. 5,272,236 and 5,278,272, the disclosures of which are incorporated herein by reference; and high pressure, free radical polymerized ethylene polymers and copolymers such as low density polyethylene (LDPE).

Polymer compositions described in U.S. Pat. Nos. 6,566,446, 6,538,070, 6,448,341, 6,316,549, 6,111,023, 5,869,575, 5,844,045, or 5,677,383, each of which is incorporated herein by reference in its entirety, are also suitable in some embodiments. Of course, blends of polymers may be used as well. In some embodiments, the blends include two different Ziegler-Natta polymers. In other embodiments, the blends may include blends of a Ziegler-Natta and a metallocene polymer. In still other embodiments, the polymer used herein may be a blend of two different metallocene polymers. In other embodiments polymers produced from single site catalysts may be used. In yet another embodiment, block or multi-block copolymers may be used in embodiments of the invention. Such polymers include those described and claimed in WO2005/090427 (having priority to U.S. Ser. No. 60/553,906, filed Mar. 7, 2004).

In some particular embodiments, the polymer is a propylene-based copolymer or interpolymer. In some embodiments, the propylene/ethylene copolymer or interpolymer is characterized as having substantially isotactic propylene sequences. The term "substantially isotactic propylene sequences" and similar terms mean that the sequences have an isotactic triad (mm) measured by $^{13}$C NMR of greater than about 0.85, preferably greater than about 0.90, more preferably greater than about 0.92 and most preferably greater than about 0.93. Isotactic triads are well-known in the art and are described in, for example, U.S. Pat. No. 5,504,172 and WO 00/01745, which refer to the isotactic sequence in terms of a triad unit in the copolymer molecular chain determined by $^{13}$C NMR spectra.

In other particular embodiments, the thermoplastic polymer may be ethylene vinyl acetate (EVA) based polymers. In other embodiments, the thermoplastic polymer may be ethylene-methyl acrylate (EMA) based polymers. In other particular embodiments, the ethylene-α olefin copolymer may be ethylene-butene, ethylene-hexene, or ethylene-octene copolymers or interpolymers. In other particular embodiments, the propylene-α olefin copolymer may be a propylene-ethylene or a propylene-ethylene-butene copolymer or interpolymer.

In certain embodiments, the non-polar thermoplastic polymer may be an ethylene-octene copolymer or interpolymer having a density between 0.863 and 0.911 g/cc and melt index (190° C. with 2.16 kg weight) from 0.1 to 100 g/10 min. In other embodiments, the ethylene-octene copolymers may have a density between 0.863 and 0.902 g/cc and melt index (190° C. with 2.16 kg weight) from 0.8 to 35 g/10 min.

In certain embodiments, the non-polar thermoplastic polymer may be a propylene-ethylene copolymer or interpolymer having an ethylene content between 5 and 20% by weight and a melt flow rate 230° C. with 2.16 kg weight) from 0.5 to 300 g/10 min. In other embodiments, the propylene-ethylene copolymer or interpolymer may have an ethylene content between 9 and 12% by weight and a melt flow rate (230° C. with 2.16 kg weight) from 1 to 100 g/10 min.

In certain other embodiments, the non-polar thermoplastic polymer may be a low density polyethylene having a density between 0.911 and 0.925 g/cc and melt index (190° C. with 2.16 kg weight) from 0.1 to 100 g/10 min.

In other embodiments, the non-polar thermoplastic polymer may have a crystallinity of less than 50 percent. In preferred embodiments, the crystallinity of the non-polar thermoplastic polymer may be from 5 to 35 percent. In more preferred embodiments, the crystallinity may range from 7 to 20 percent.

In certain other embodiments, the non-polar thermoplastic polymer may have a melting point of less than 110° C. In preferred embodiments, the melting point may be from 25 to 100° C. In more preferred embodiments, the melting point may be between 40 and 85° C.

In certain embodiments, the non-polar thermoplastic polymer may have a weight average molecular weight greater than 20,000 g/mole. In preferred embodiments, the weight average molecular weight may be from 20,000 to 150,000 g/mole; in more preferred embodiments, from 50,000 to 100,000 g/mole.

Those having ordinary skill in the art will recognize that the above list is a non-comprehensive listing of suitable polymers. It will be appreciated that the scope of the present invention is restricted by the claims only.

Dispersion Formulations

Dispersions, both aqueous and non-aqueous, may be formed using the interpolymers described above or formulations comprising the same. Frothed foams comprising the interpolymers may also be formed, as disclosed in PCT Publication No. WO2005/21622, filed Aug. 25, 2004, and published as WO2005/021622. The interpolymers may also be crosslinked by any known means, such as the use of peroxide, electron beam, silane, azide, or other cross-linking technique. The polymers may also be chemically modified, such as by grafting (for example by use of maleic anhydride (MAH), silanes, or other grafting agent), halogenation, amination, sulfonation, or other chemical modification.

Dispersions formed in accordance with embodiments disclosed herein may include a base polymer, which may comprise at least one multi-block olefin interpolymer, and a stabilizing agent, which may comprise at least one polar polyolefin. The multi-block olefin interpolymer, in some embodiments, may be propylene-based interpolymers, ethylene-based interpolymers, or combinations thereof.

With respect to the multi-block interpolymer and the stabilizing agent, in some embodiments, the at least one multi-block olefin interpolymer may comprise between about 30 percent to about 99 percent by weight of the total amount of base polymer and stabilizing agent in the composition. In other embodiments, the at least one multi-block olefin interpolymer may comprise between about 50 percent and about 90 percent of the total amount of base polymer and stabilizing agent in the composition. In yet other embodiments, the one or more non-polar polyolefins may comprise between about 60 percent and about 80 percent of the total amount of base polymer and stabilizing agent in the composition.

The one or more multi-block olefin interpolymer resins may be contained within the aqueous dispersion in an amount from about 1 percent by weight to about 96 percent by weight. In some embodiments, the multi-block olefin interpolymer may be present in the aqueous dispersion in an amount from about 10 percent by weight to about 80 percent by weight. In other embodiments, the multi-block olefin interpolymer may be present in an amount from about 20 percent to about 70 percent by weight; and, from about 30 percent to about 60 weight percent by weight in yet other embodiments.

Dispersions formed in accordance with embodiments disclosed herein may include a base polymer, which may include at least one multi-block olefin interpolymer, a secondary polymeric component, which may include at least one thermoplastic polyolefin, and a stabilizing agent. The at least one multi-block polyolefin, in some embodiments, may comprise from about 30 percent to 95 percent by weight of the total amount of base polymer, secondary polymer, and stabilizing agent in the composition. In other embodiments, the at least one multi-block olefin interpolymer may comprise between about 50 percent and about 80 percent by weight; and, between about 60 percent to about 70 percent by weight in yet other embodiments. In some embodiments, the secondary polymeric component may comprise from 1 to 48 percent by weight of the total amount of base polymer, secondary polymer, and stabilizing agent in the composition. In other embodiments, the secondary polymeric component may comprise from 5 to 30 percent by weight; and from 10 to 25 percent by weight in yet other embodiments.

Benefits derived from a multi-block olefin interpolymer may also be realized where the multi-block interpolymer is used as a minority component in a dispersion. Accordingly, dispersions formed in accordance with other embodiments disclosed herein may include a base polymer, which may include at least one non-polar thermoplastic polyolefin, a secondary polymeric component, which may include at least one multi-block olefin interpolymer, and a stabilizing agent. The base polymer, in some embodiments, may comprise from about 30 percent to 95 percent by weight of the total amount of base polymer, multi-block olefin interpolymer, and stabilizing agent in the composition. In other embodiments, the base polymer may comprise between about 50 percent and about 80 percent by weight; and, between about 60 percent to about 70 percent by weight in yet other embodiments. In other embodiments, the multi-block olefin interpolymer component may comprise from 1 to 48 percent by weight of the total amount of base polymer, multi-block olefin interpolymer, and stabilizing agent in the composition. In other embodiments, the multi-block olefin interpolymer component may comprise from 5 to 30 percent by weight; and from 10 to 25 percent by weight in yet other embodiments.

With respect to the filler, typically, an amount greater than about 0 to about 1000 parts per hundred of the polymer (polymer meaning here the multi-block interpolymer combined with the thermoplastic polymer (if any) and the stabilizing agent) is used. In selected embodiments, between about 50 to 250 parts per hundred are used. In other selected embodiments, between about 10 to 500 parts per hundred are used. In still other embodiments, from between about 20 to 400 parts per hundred are used. In other embodiments, from about 0 to about 200 parts per hundred are used.

The solid materials (multi-block interpolymer plus thermoplastic polymer (if any) plus stabilizing agent) are preferably dispersed in a liquid medium, which in preferred embodiments is water. In preferred embodiments, sufficient neutralization agent is added to neutralize the resultant dispersion to achieve a pH range of between about 4 to about 14. In preferred embodiments, sufficient base is added to maintain a pH of between about 6 to about 11; in other embodiments, the pH may be between about 8 to about 10.5. Water content of the dispersion is preferably controlled so that the solids content is between about 1% to about 74% by volume. In another embodiment, the solid content is between about 25% to about 74% by volume. In particular embodiments, the solids range may be between about 10% to about 70% by weight. In other particular embodiments, the solids range is between about 20% to about 60% by weight. In particularly preferred embodiments, the solids range is between about 30% to about 55% by weight.

Dispersions formed in accordance with embodiments of the present invention are characterized in having an average particle size of between about 0.1 to about 5.0 microns. In other embodiments, dispersions have an average particle size of from about 0.5 μm to about 2.7 μm. In other embodiments, from about 0.8 μm to about 1.2 μm. By "average particle size", the present invention means the volume-mean particle size. In order to measure the particle size, laser-diffraction techniques may be employed for example. A particle size in this description refers to the diameter of the polymer in the dispersion. For polymer particles that are not spherical, the diameter of the particle is the average of the long and short axes of the particle. Particle sizes may be measured on a Beckman-Coulter LS230 laser-diffraction particle size analyzer or other suitable device.

For example, a formulation of the present invention may include surfactants, frothing agents, dispersants, thickeners, fire retardants, pigments, antistatic agents, reinforcing fibers, antifoam agent, anti block, wax-dispersion, antioxidants, a neutralizing agent, a rheology modifier, preservatives, biocides, acid scavengers, a wetting agent, and the like. While optional for purposes of the present invention, other components may be highly advantageous for product stability during and after the manufacturing process.

In addition, embodiments of the present invention optionally include a filler wetting agent. A filler wetting agent generally may help make the filler and the polyolefin dispersion more compatible. Useful wetting agents include phosphate salts, such as sodium hexametaphosphate. A filler wetting agent may be included in a composition of the present invention at a concentration of at least about 0.5 parts per 100 parts of filler, by weight.

Furthermore, embodiments of the present invention may optionally include a thickener. Thickeners may be useful in the present invention to increase the viscosity of low viscosity dispersions. Thickeners suitable for use in the practice of the present invention may be any known in the art such as for instance poly-acrylate type or associate non ionic thickeners such as modified cellulose ethers. For example, suitable thickeners include ALCOGUM™ VEP-II (trademark of Alco Chemical Corporation), RHEOVIS™ and VISCALEX™ (trademarks of Ciba Ceigy), UCAR® Thickener 146, or ETHOCEL™ or METHOCEL™ (trademarks of the The Dow Chemical Company) and PARAGUM™ 241 (trademarks of Para-Chem Southern, Inc.), or BERMACOL™ (trademark of Akzo Nobel) or AQUALON™ (trademark of Hercules) or ACUSOL® (trademark of Rohm and Haas). Thickeners may be used in any amount necessary to prepare a dispersion of desired viscosity.

The ultimate viscosity of the dispersion is, therefore, controllable. Addition of the thickener to the dispersion including the amount of filler may be done with conventional means to result in viscosities as needed. Viscosities of thus dispersions may reach +3000 cP (Brookfield spindle 4 with 20 rpm) with moderate thickener dosing (up to 4% preferably, below 3% based on 100 phr of polymer dispersion). The starting polymer dispersion as described has an initial viscosity prior to formulation with fillers and additives between 20 and 1000 cP (Brookfield viscosity measured at room temperature with spindle RV3 at 50 rpm). Still more preferably, the starting viscosity of the dispersion may be between about 100 to about 600 cP.

Also, embodiments of the present invention are characterized by their stability when a filler is added to the polymer/stabilizing agent. In this context, stability refers to the stability of viscosity of the resultant aqueous polyolefin dispersion. In order to test the stability, the viscosity is measured over a period of time. Preferably, viscosity measured at 20° C. should remain +/−10% of the original viscosity over a period of 24 hours, when stored at ambient temperature.

The aqueous dispersion of the present invention may contain particles having an average particle size of from about 0.1 to about 5 microns. The coatings obtained therefrom exhibit excellent moisture resistance, water repellency, oil and grease resistance, thermal adhesion to paper and other natural and synthetic substrates such as metal, wood, glass, synthetic fibers and films, and woven and non-woven fabrics.

The aqueous dispersions disclosed herein may be used as coatings, as articles such as frothed foams, and adhesives for bonding and sealing various substrates, especially corrugated boxes and plastics films such as BOPP, polyester and polyamide films. Aqueous dispersion of the present invention may be used for such applications as a binder of a coating or ink composition for a coated paper, paper-board, wall-paper, or other cellulose based article. The aqueous dispersion may be coated by various techniques, for example, by spray coating, curtain coating, coating with a roll coater or a gravure coater, brush coating, or dipping. The coating is preferably dried by heating the coated substrate to 70-150° C. for 1 to 300 sec.

Examples of aqueous dispersions that may be incorporated into the additive composition of the present disclosure are disclosed, for instance, in U.S. Patent Application Publication No. 2005/0100754, U.S. Patent Application Publication No. 2005/0192365, PCT Publication No. WO 2005/021638, and PCT Publication No. WO 2005/021622, which are all incorporated herein by reference.

Some embodiments of the foams formed from the aqueous dispersion disclosed herein may have a compression set value, as defined below, at testing conditions of 80° C., 20 minutes, and 0.5 psig, of less than 80 percent. In other embodiments, the foams may have a compression set of less than 70 percent; less than 65 percent in other embodiments; and less than 60 percent in yet other embodiments.

Some embodiments of the foams formed from the aqueous dispersion disclosed herein may have a compression set value, as defined below, at testing conditions of 80° C., 20 minutes, and 0.25 psig, of less than 70 percent. In other embodiments, the foams may have a compression set of less than 60 percent; less than 55 percent in other embodiments; and less than 50 percent in yet other embodiments.

Some embodiments of the foams formed from the aqueous dispersion disclosed herein may have a compression set value, as defined below, at testing conditions of 80° C., 20 minutes, and 0.1 psig, of less than 60 percent. In other embodiments, the foams may have a compression set of less than 50 percent; less than 45 percent in other embodiments; and less than 40 percent in yet other embodiments.

Forming the Dispersion

The dispersions of the present invention may be formed by any number of methods recognized by those having skill in the art. In selected embodiments, the dispersions may be formed by using techniques, for example, in accordance with the procedures as described in WO2005/021638, which is incorporated by reference in its entirety.

In a specific embodiment, a multi-block interpolymer, a stabilizing agent, and a filler are melt-kneaded in an extruder along with water and a neutralizing agent, such as ammonia, potassium hydroxide, or a combination of the two to form a dispersion. Those having ordinary skill in the art will recognize that a number of other neutralizing agents may be used. In some embodiments, the filler may be added after blending the base polymer and stabilizing agent. In some embodiments, the dispersion is first diluted to contain about 1 to about 3% by weight water and then, subsequently, further diluted to comprise greater than about 25% by weight water.

Any melt-kneading means known in the art may be used. In some embodiments, a kneader, a BANBURY® mixer, single-screw extruder, or a multi-screw extruder is used. A process for producing the dispersions in accordance with the present invention is not particularly limited. One preferred process, for example, is a process comprising melt-kneading the above-mentioned components according to U.S. Pat. Nos. 5,756,659 and 6,455,636.

FIG. 1 schematically illustrates an extrusion apparatus that may be used in embodiments of the invention. An extruder 1, in certain embodiments a twin screw extruder, is coupled to a back pressure regulator, melt pump, or gear pump 2. Embodiments also provide a base reservoir 3 and an initial water reservoir 4, each of which includes a pump (not shown). Desired amounts of base and initial water are provided from the base reservoir 3 and the initial water reservoir 4, respectively. Any suitable pump may be used, but in some embodiments a pump that provides a flow of about 150 cc/min at a pressure of 240 bar is used to provide the base and the initial water to the extruder 20. In other embodiments, a liquid injection pump provides a flow of 300 cc/min at 200 bar or 600 cc/min at 133 bar. In some embodiments, the base and initial water are preheated in a preheater.

Polymer resin(s), in the form of pellets, powder, or flakes, for example, is fed from the feeder 7 to an inlet 8 of the extruder 1 where the resin is melted or compounded. In some embodiments, the dispersing agent is added to the resin through and along with the resin and in other embodiments, the dispersing agent is provided separately to the twin screw extruder 1. The resin melt is then delivered from the mix and convey zone to an emulsification zone of the extruder where the initial amount of water and base from the reservoirs 3 and 4 is added through inlet 5. In some embodiments, dispersing agent may be added additionally or exclusively to the water stream. In some embodiments, the emulsified mixture is further diluted with additional water inlet 9 from reservoir 6 in a dilution and cooling zone of the extruder 1. Typically, the dispersion is diluted to at least 30 weight percent water in the cooling zone. In addition, the diluted mixture may be diluted any number of times until the desired dilution level is achieved. In some embodiments, water is not added into the twin screw extruder 1 but rather to a stream containing the resin melt after the melt has exited from the extruder. In this manner, steam pressure build-up in the extruder 20 is eliminated.

In particular embodiments, it may be desired to utilize the dispersion in the form of foam. When preparing foams, it is often preferred to froth the dispersion. For example, a froth and foam may be prepared as described in WO2005/021622, which is fully incorporated herein by reference. Preferred in the practice of this invention is the use of a gas as a frothing agent. Examples of suitable frothing agents include: gases and/or mixtures of gases such as, air, carbon dioxide, nitrogen, argon, helium, and the like. Particularly preferable is the use of air as a frothing agent. Frothing agents are typically introduced by mechanical introduction of a gas into a liquid to form a froth. This technique is known as mechanical frothing. In preparing a frothed dispersion, it is preferred to mix all components and then blend the air or gas into the mixture, using equipment such as an OAKES, MONDO, or FIRESTONE frother.

Surfactants useful for preparing a stable froth are referred to herein as foam stabilizers. Foam stabilizers are useful in the practice of the present invention. Those having ordinary skill in this field will recognize that a number of foam stabilizers may be used. Foam stabilizers may include, for example, sulfates, succinamates, and sulfosuccinamates.

EXAMPLES

Dispersion 1

An aqueous dispersion of an ethylene-octene interpolymer having hard and soft segments is formed in accordance with the procedures as described in WO2005/021638 and briefly described above with respect to FIG. 1. Dispersion 1 is formed using an ethylene-octene interpolymer having the following properties as shown below:

| (g/cc) | MI | I10 | I10/MI | $T_c$ (°C.) | $T_m$ (°C.) | Heat of Fusion (J/g) | Cryst (wt %) | $T_{CRYSTAF}$ (°C.) | $T_m$-$T_{CRYSTAF}$ (°C.) | DSC Soft Segment Density | DSC Hard Segment Density (g/cc) | DSC Wt % Soft Seg | DSC wt % Hard Seg |
|---|---|---|---|---|---|---|---|---|---|---|---|---|---|
| 0.877 | 4.7 | 31.5 | 6.7 | 97 | 119 | 52 | 18 | 48 | 72 | 0.858 | 0.943 | 76 | 24 |

| DSC Wt % Soft Segment with fixed HS density (0.96 g/cc) | DSC wt % Hard Segment with fixed HS density (0.96 g/cc) | [Zn]/[C2]*1000 | Zn level in polymer (ppm) |
|---|---|---|---|
| 79 | 21 | 2.53 | 491 |

The surfactant system used is UNICID™ 350 (a C26 carboxylic acid obtained from Baker-Petrolite, acid value 115 mg KOH/g). UNICID™ is used at a loading of 3 weight percent based on the weight of the ethylene-octene interpolymer. The addition for all other ingredients is also based on the weight of the ethylene-octene interpolymer.

The ethylene-octene interpolymer is dry blended with the surfactant. The mixture is then extruded at 4.5 kg/h (10 lbs/h) using a Berstorff ZE25 (36 L/D, 450 rpm) and a Schenck Mechatron loss-in-weight feeder. An ISCO dual-syringe pump meters a 45% (w/w) potassium hydroxide solution at 0.9 cc/min and DI water at 1.2 cc/min. The potassium hydroxide solution and deionized (DI) water are mixed and pre-heated through a 24 inch core/shell heat exchanger (20 foot ⅛ inch tubing core) tempered by a DC200 silicone oil bath set at 150° C. and fed to the initial aqueous (IA) injector. Dilution water is delivered to the dilution water injector at a rate of 100 cc/min using an ISCO dual syringe pump. The dilution water is also passed through a similar pre-heater set at 150° C. Back pressure on the barrel is provided via a GO (Circor) BP-60 back-pressure regulator adjusted to maintain about 17.2 bar (250 psig) upstream pressure.

The dispersion product is collected directly after the back-pressure regulator, allowed to cool, filtered, and analyzed for particle size, pH, solids content, and viscosity. The aqueous dispersion produced has a solids content of 55 weight percent, a pH of 11.4, and a viscosity (RV-2 spindle, 22.5° C., 100 rpm) of 65 centipoise. The dispersed polymer phase measured by a Coulter LS230 particle analyzer consists of an average volume diameter particle size of 0.6 microns.

A froth and foam, Sample 1, is then prepared from Dispersion 1 in a manner consistent with Example 1 of WO2005/021622. Comparative foam samples are made using conventional ethylene-octene copolymer dispersions formed in a similar manner to that described for Dispersion 1 above. Comparative foam sample 1 (CS1) is formed using AFFINITY™ 8200 (available from The Dow Chemical Co.); Comparative foam Sample 2 (CS2) is formed using a blend of AFFINITY™ EG 8200 with AFFINITY PL1280 (an ethylene/1-octene copolymer having a MWD of about 2.5, available from The Dow Chemical Company); Comparative Foam Sample 3 (CS3) using a similar blend of AFFINITY™ EG 8200 with AFFINITY PL1280 with 20 weight percent polypropylene fibers added.

The foams are evaluated for compression set at various temperatures and pressures. Compression set testing is used to determine the ability of materials to maintain elastic properties after prolonged compressive stress. To perform the compression set test, the thickness of the original specimen is measured. The specimen is then placed between spacers and in the compression device. The specimen is compressed to a fraction of its original height under a given load of 6.9 millibar gage, 17.2 millibar gage, or 34.5 millibar gage (0.1 psig, 0.25 psig, 0.5 psig). Shortly after assembly, the compression device is placed in an oven at a specified temperature for a given time period. After removing the sample from the oven, pressure is relieved from the specimen, and the specimen is allowed to cool to room temperature before measuring the final thickness. Compression set is expressed as a percentage of the original thickness that remained set, i.e. did not recover (a sample having a thickness of 1.00 cm before compression and 0.95 cm after the test would have a compression set value of 5%, i.e. it did not recover 5% of its original thickness. The results of the compression set tests are given in Table 1, where the tests were performed at the indicated pressure, at a temperature of 85° C., and a time period of 20 minutes.

TABLE 1

| Foam Sample | Compression Pressure (psig) | Compression Set (Average % decrease in thickness) |
|---|---|---|
| CS1 | 0.1 | 92 |
|  | 0.25 | 94 |
|  | 0.5 | 96 |
| CS2 | 0.1 | 73 |
|  | 0.25 | 81 |
|  | 0.5 | 83 |
| CS3 | 0.1 | 67 |
|  | 0.25 | 79 |
|  | 0.5 | 80 |
| Sample 1 | 0.1 | 37 |
|  | 0.25 | 49 |
|  | 0.5 | 61 |

As the results in Table 1 illustrate, foams formed from dispersion Sample 1 had a reduced amount of foam collapse as compared to foams formed from conventional ethylene-octene copolymers in a compression set test. The reduced foam collapse additionally indicates improved heat resistance provided by the block structure of the block interpolymer used in Dispersion 1.

Detailed Froth Preparation

A sample of 150 parts of Dispersion 1 is blended, in a conventional mixing bowl and taking care not to entrain air while blending, with 16.5 parts of a 10% solution (1.65 parts active) of the selected frothing surfactant (potassium stearate) and with 10.9 parts (0.33 part active) of a 2.5% aqueous solution of the hydroxyalkyl cellulose ether METHOCEL E4M hydroxypropyl methylcellulose thickener supplied by The Dow Chemical Company. Froth samples are prepared with a Hobart-type stand mixer KitchenAid Professional mixer (Model KSM50PWH) and a wire whip.

After the initial blend is prepared, air is entrained by mechanical frothing using the same mixer and wire whip and by increasing the mixer speed from medium to high over a period of approximately 5 to 10 minutes, until a stiff froth is formed. Density of the froth is measured by weighing a 3 oz (89 ml) paper cup filled with froth. Once the desired density is reached, whipping is stopped. Dispersion densities are often between about 900 to 1000 g/L, while the resultant whipped density may be about 100 g/L to 300 g/L. Those having ordinary skill in the art will appreciate that the final density of the whipped dispersion may be controlled as desired by modifying the whipping times, for example. In select embodiments, the whipped dispersion is formed at a temperature less than the melting point of the dispersed polymer. More preferably, the dispersion is formed at about 25 C+/−10 C of the melting point of the dispersed polymer.

Additional comparison dispersions used for making foams for testing are as follows:

AFFINITY EG8200 (available from The Dow Chemical Company, Midland, Mich.) with 2% UNICID 350 and 1% HYSTRENE 4516, 51.7% active; 1% STEPANOL WAT-k (from an ~39% active solution) and the METHOCEL is formulated into the dispersion once the dispersion is cooled to room temperature (CS1).

70/30 blend of AFFINITY EG8200/AFFINITY PL1280 (both available from The Dow Chemical Company, Midland, Mich.) with 2% UNICID 350 and 1% HYSTRENE 4516, 52.2% active, 1% STEPANOL WAT-k (from an ~39% active solution) and 0.35% METHOCEL is formulated into the dispersion once the dispersion is cooled to room temperature (CS 2).

70/30 blend of AFFINITY EG8200/AFFINITY PL1280 (both available from The Dow Chemical Company, Midland, Mich.) with 2% UNICID 350 and 1% HYSTRENE 4516, 52.2% active, 1% STEPANOL WAT-k (from an ~39% active solution) and 0.35% METHOCEL is formulated into the dispersion once the dispersion is cooled to room temperature. Polypropylene fiber is slowly added to the dispersion in the standard mixing bowl as it is mixed on low. Once all of the fiber is added, mix an additional one minute and then begin the frothing process by increasing the mixer speed to high (CS3).

Foam Preparation/Drying

Froth prepared as described above is spread on release paper supported by a stiffer paper sheet and is smoothed to a height of about 0.25 in (~0.63 cm) or as desired. The froth is placed in a Blue M forced air oven at drying temperature of approximately 75 to 100° C. (~167 to 212° F.) for about 10 minutes. The oven temperature setting is then increased to approximately 120 to 1.35° C. (~248 to 275° F.) and takes approximately 17 minutes to reach set temperature. The froth remains in the oven for approximately 6 minutes additionally and the dry foam sheet is recovered from the oven.

Foam Compression Testing

Six samples measuring two inches wide by two inches in height are cut from a large polyolefin foam sample. Three sample weights are constructed weighing 197 g, 455 g, and 907 g corresponding with the desired loads of 0.1, 0.25 and 0.5 psi on the 4 sq in samples. Two sample patches are placed under each load and heated in an 85° C. oven for 20 min. The samples are removed from the oven and the weights are removed. Compressed samples are allowed to cool and final thickness measurements are taken.

Foam Compression Data

Figure 2:
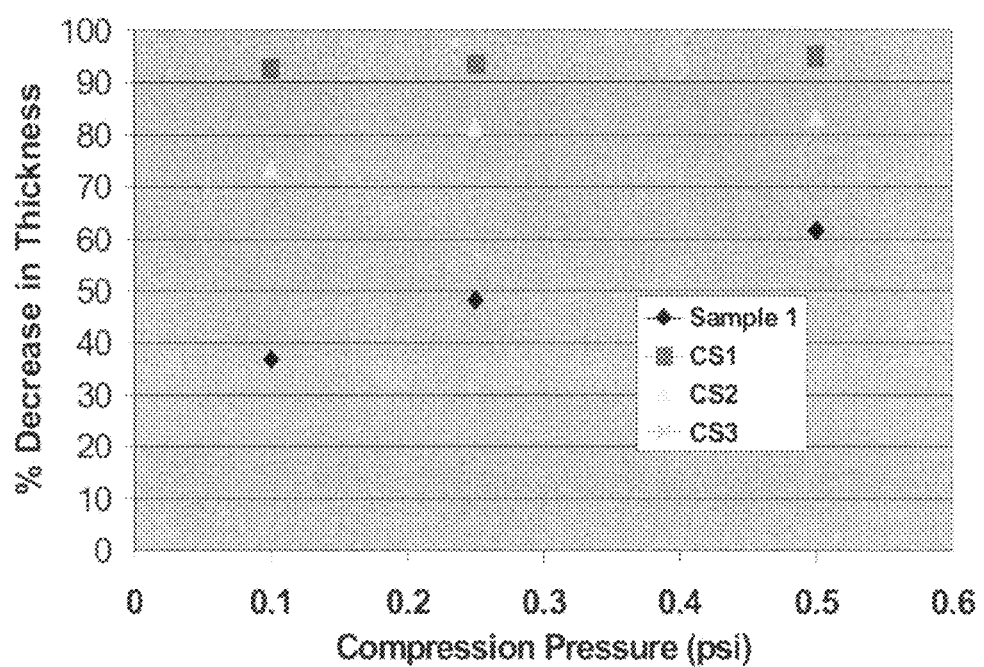
FIG. 2 graphically compares compression test results for foam samples according to embodiments disclosed herein with those for comparative foam samples.

Comparison of samples compressed at 85° C. for 20 minutes under various loads are presented in the Table below and in FIG. 2.

| Sample ID | Load (psig) | Average Initial thickness (cm) | Average Final thickness (cm) | Average % Decrease in thickness |
|---|---|---|---|---|
| Multi-block (Sample 1) | 0.1 | 0.253 | 0.155 | 38.52 |
| | | 0.262 | 0.169 | 35.29 |
| | 0.25 | 0.255 | 0.134 | 47.38 |
| | | 0.248 | 0.126 | 49.19 |
| | 0.5 | 0.245 | 0.093 | 61.96 |
| | | 0.270 | 0.104 | 61.41 |
| EG8200 2-1-1 (CS 1) | 0.1 | 0.336 | 0.026 | 92.41 |
| | | 0.357 | 0.025 | 93.14 |
| | 0.25 | 0.390 | 0.025 | 93.71 |
| | | 0.310 | 0.020 | 93.70 |
| | 0.5 | 0.384 | 0.020 | 94.79 |
| | | 0.400 | 0.019 | 95.24 |
| 70/30 EG8200/PL1280 (CS 2) | 0.1 | 0.422 | 0.111 | 73.82 |
| | | 0.387 | 0.104 | 73.26 |
| | 0.25 | 0.449 | 0.080 | 82.27 |
| | | 0.428 | 0.082 | 80.82 |
| | 0.5 | 0.402 | 0.072 | 82.09 |
| 70/30 EG8200/PL1280 w/20% PP fibers (CS 3) | 0.1 | 0.498 | 0.167 | 66.47 |
| | | 0.471 | 0.160 | 66.14 |
| | 0.25 | 0.474 | 0.106 | 77.64 |
| | | 0.488 | 0.104 | 78.67 |
| | 0.5 | 0.483 | 0.095 | 80.33 |

Comparison of samples compressed at 50° C. for 3 days under various loads.

| Sample ID | Load (psig) | Average Initial thickness (cm) | Average Final thickness (cm) | Average % Decrease in thickness |
|---|---|---|---|---|
| Multi-block (Sample 1) | 0.1 | 0.242 | 0.167 | 0.31 |
| | | 0.231 | 0.153 | 0.34 |
| | 0.25 | 0.213 | 0.113 | 0.47 |
| | | 0.227 | 0.121 | 0.47 |
| | 0.5 | 0.230 | 0.105 | 0.54 |
| | | 0.220 | 0.099 | 0.55 |

As can be seen from the above, polyolefin froth foams formed from the dispersion of multi-block olefin interpolymers may have a number of useful properties. Modified frothed foams are also within the purview of this invention and can include micro-cavity containing thermoplastic foams such as those disclosed in U.S. Provisional Application Ser. No. 60/700,644. The micro-cavity containing additives include such materials as super absorbent polymers (SAP) for articles such as infant and children diapers, adult incontinence pants, feminine hygiene pads, household cleaning articles, pet urine absorption mats/pads, and garbage bag liquid absorbent pads.

Advantageously, the present invention provides for dispersions of multi-block olefin interpolymers. In some embodiments the dispersions may be aqueous. These block interpolymers may have a soft (low crystallinity) segment rich in comonomer and a hard segment (high crystallinity) which is rather low in comonomer content. This heterogeneous structure may allow for a polymer having the same overall comonomer content (and crystallinity) of a standard homogeneous ethylene-copolymer with a broader melting range. Coatings and articles produced from dispersions disclosed herein may advantageously have a higher, heat resistance, a greater resistance to compression set at elevated temperatures, and may exhibit a broader operating window in various extrusion and molding process.

These dispersions may be used as coatings and as articles such as frothed foams. Alternative uses for these dispersions include adhesives for bonding and sealing various substrates, especially corrugated boxes and plastics films such as biaxially oriented polypropylene (BOPP), polyester and polyamide films. Additionally, these foams may be used in the construction of diapers and feminine hygiene pads as the liquid absorbent and distribution layer. Today, such diapers and feminine hygiene pads are packaged tightly. Foams formed from dispersions disclosed herein may provide significantly lower compression set at 40° C., allowing near full recovery of the original foam thickness, a requirement for the end product.

In another aspect, the multi-block interpolymers may be used as a coating or adhesive where heat resistance is required. Many automotive applications require heat resistance at temperatures of 60° C. and higher. A dispersions produced using a standard metallocene-based ethylene-octene copolymer having density of 0.870 g/cc and a melt index (12 at 190° C.) of 5 g/10 min. will fail as a coating or adhesive at temperatures of 60° C. and higher. A coating or adhesive based on a dispersion on a multi-block olefin interpolymer having density of 0.870 g/cc, a melt index (12 at 190° C.) of 5 g/10 min., and a hard segment content of 30% may achieve sufficient heat resistance.

In addition to the mechanical emulsification of a single multi-block interpolymer, blends of different multi-block interpolymers and blends of multi-block interpolymers and other polyolefins and plastics may be produced to enhance certain properties such as adhesion to specific substrates such as paper or glass and heat resistance.

In another embodiment of the present invention, a dispersion of catalytic linear multi-block olefins may be used in connection with other dispersions to form a blended dispersion product.

In another embodiment of the present invention, a dispersion of catalytic linear multi-block olefins may be dispersed into a monomer, such as acrylonitrile. This monomer may be later polymerized, which has the effect of dispersing the multi-block olefin polymer in a secondary polymer.

In addition to the applications described above, catalytic linear multi-block olefin interpolymer as described herein may be useful in a number of other applications.

Accordingly, in one application, dispersions of catalytic linear multi-block olefins may be useful in cellulose-based articles, especially having a specific volume of less than 3 cc/gm, for example, paper and board structures, incorporating a compound comprising an aqueous polyolefin dispersion resulting in articles having improved properties. In various embodiments, the articles can have improved oil and grease resistance, improved water resistance, controlled coefficients of friction, thermal embossability, thermal formability, improved wet and dry strength, or an improved softness, among others. Such techniques and compositions are disclosed in U.S. Application Ser. No. 60/750,466, which is expressly incorporated by reference in its entirety.

Thus, in one application, dispersions of catalytic linear multi-block olefins may be useful in providing a cellulose-based article having, especially those having a specific volume of less than 3 cc/gm, including: a cellulose-based composition; and an applied compound. The applied compound, at the time of application, may include a catalytic linear multi-block olefin interpolymer, and at least one dispersing agent wherein the catalytic linear multi-block olefin interpolymer comprises at least one hard segment and at least one soft segment. The article may have an oil and grease resistance value of at least 9 as measured using the Kit test at an exposure time of 15 seconds.

Thus, in one application, dispersions of catalytic linear multi-block olefins may be useful in providing a cellulose-based article, especially those having a specific volume of less than 3 cc/gm, including: a cellulose-based composition; and an applied compound. The applied compound, at the time of application, may include a catalytic linear multi-block olefin interpolymer, and at least one dispersing agent wherein the catalytic linear multi-block olefin interpolymer comprises at least one hard segment and at least one soft segment. The cellulose-based article may have a water resistance value of less than about 10 $g/m^2/120$ seconds as measured via the Cobb test.

The Kit test: the kit value of samples may be determined using TAPPI T559 cm-02. The test was performed flat as described in the TAPPI test. This involves putting five separate drops of oil onto the board's surface and inspecting the board after a specified amount of exposure time (15 seconds) to see if any pronounced darkening of the paper appears. A modified Kit test run at elevated temperature(s) can be useful to distinguish deposited dispersions made using the catalytic linear multi-block polymers, especially for ethylene based block polymers versus other ethylene based random copolymers. Such elevated temperatures for testing can be as high as about 80° C., but preferably tested around 50° C. Film layers made using deposited dispersions from the catalytic linear ethylenic multi-block polymers show higher Kit values at 50° C. than Kit values (also at 50° C.) for random ethylene polymer based deposited dispersions, even at similar overall ethylene polymer density and melt index.

The Cobb test: Cobb tests may be performed in accordance with ASTM D3285-93. The exposure time was 2 minutes. The test involves a known volume of water (100 ml) being poured onto a specific area of the board's surface (100 $cm^2$). The board is weighed before and after the exposure and the difference between the two can then be expressed as the weight per unit area of water absorbed in that given time; the lower the Cobb value, the better the result. A modified Cobb test run at elevated temperature(s) can be useful to distinguish deposited dispersions made using the catalytic linear multi-block polymers, especially for ethylene based block polymers versus other ethylene based random copolymers. Such elevated temperatures for testing can be as high as about 80° C., but preferably tested around 50° C. Film layers made using deposited dispersions from the catalytic linear ethylenic multi-block polymers show lower Cobb values at 50° C. than Cobb values (also at 50° C.) for random ethylene polymer based deposited dispersions, even at similar overall ethylene polymer density and melt index.

Thus, embodiments disclosed herein may relate to cellulose-based compositions, which are generally referred to as "paper and/or paperboard products" (i.e., other than paper towels), such as newsprint, uncoated groundwood, coated groundwood, coated free sheet, uncoated free sheet, packaging and industrial papers, linerboard, corrugating medium, recycled paperboard, bleached paperboard, writing paper, typing paper, photo quality paper, wallpaper, etc. Such compositions can generally be formed in accordance with the present invention from at least one paper web.

For example, in one embodiment, the paper product can contain a single-layered paper web formed from a blend of fibers. In another embodiment, the paper product can contain a multi-layered paper (i.e., stratified) web. Furthermore, the paper product can also be a single- or multi-ply product (e.g., more than one paper web), wherein one or more of the plies may contain a paper web formed according to the present invention. Normally, the basis weight of a paper product of the present invention is between about 10 to about 525 grams per square meter (gsm). Normally, the specific volume of a paper product in accordance with embodiments of the present invention is between about 0.3 to about 2 grams per cubic centimeter (g/cc).

Any of a variety of materials can be used to form the paper products of the present invention. For example, the material used to make paper products can include fibers formed by a variety of pulping processes, such as kraft pulp, sulfite pulp, thermomechanical pulp, etc.

Papermaking fibers useful in the process of the present invention include any cellulosic fibers that are known to be useful for making cellulosic base sheets. Suitable fibers include virgin softwood and hardwood fibers along with non-woody fibers, as well as secondary (i.e., recycled) papermaking fibers and mixtures thereof in all proportions. Non-cellulosic synthetic fibers can also be included in the aqueous suspension. Papermaking fibers may be derived from wood using any known pulping process, including kraft and sulfite chemical pulps.

Fibers suitable for making paper webs comprise any natural or synthetic cellulosic fibers including, but not limited to nonwoody fibers, such as cotton, abaca, kenaf, sabai grass, flax, esparto grass, straw, jute hemp, bagasse, milkweed floss fibers, and pineapple leaf fibers; and woody fibers such as those obtained from deciduous and coniferous trees, including softwood fibers, such as northern and southern softwood kraft fibers; hardwood fibers, such as eucalyptus, maple, birch, and aspen. Woody fibers can be prepared in high-yield or low-yield forms and can be pulped in any known method, including kraft, sulfite, high-yield pulping methods and other known pulping methods. Fibers prepared from organosolv pulping methods can also be used, including the fibers and methods disclosed in U.S. Pat. No. 4,793,898, issued Dec. 27, 1988 to Laamanen et al.; U.S. Pat. No. 4,594,130, issued Jun. 10, 1986 to Chang et al.; and U.S. Pat. No. 3,585,104. Useful fibers can also be produced by anthraquinone pulping, exemplified by U.S. Pat. No. 5,595,628 issued Jan. 21, 1997, to Gordon et al.

In one embodiment, a portion of the fibers, such as up to 50% or less by dry weight, or from about 5% to about 30% by dry weight, can be synthetic fibers such as rayon, polyolefin fibers, polyester fibers, bicomponent sheath-core fibers, multi-component binder fibers, and the like. An exemplary polyethylene fiber is PULPEX®, available from Hercules, Inc. (Wilmington, Del.). Any known bleaching method can be used. Synthetic cellulose fiber types include rayon in all its varieties and other fibers derived from viscose or chemically-modified cellulose. Chemically treated natural cellulosic fibers can be used such as mercerized pulps, chemically stiffened or crosslinked fibers, or sulfonated fibers. For good mechanical properties in using papermaking fibers, it can be desirable that the fibers be relatively undamaged and largely unrefined or only lightly refined. While recycled fibers can be used, virgin fibers are generally useful for their mechanical properties and lack of contaminants. Mercerized fibers, regenerated cellulosic fibers, cellulose produced by microbes, rayon, and other cellulosic material or cellulosic derivatives can be used. Suitable papermaking fibers can also include recycled fibers, virgin fibers, or mixes thereof. In certain embodiments capable of high bulk and good compressive properties, the fibers can have a Canadian Standard Freeness of at least 200, more specifically at least 300, more specifically still at least 400, and most specifically at least 500. In some other embodiments, portions of the fibers up to about 90% by dry weight may be synthetic fibers.

Other papermaking fibers that can be used in the present disclosure include paper broke or recycled fibers and high yield fibers. High yield pulp fibers are those papermaking fibers produced by pulping processes providing a yield of about 65% or greater, more specifically about 75% or greater, and still more specifically about 75% to about 95%. Yield is the resulting amount of processed fibers expressed as a percentage of the initial wood mass. Such pulping processes include bleached chemithermomechanical pulp (BCTMP), chemithermomechanical pulp (CTMP), pressure/pressure thermomechanical pulp (PTMP), thermomechanical pulp (TMP), thermomechanical chemical pulp (TMCP), high yield sulfite pulps, and high yield Kraft pulps, all of which leave the resulting fibers with high levels of lignin. High yield fibers are well known for their stiffness in both dry and wet states relative to typical chemically pulped fibers.

In some embodiments, the pulp fibers may include softwood fibers having an average fiber length of greater than 1 mm and particularly from about 2 to 5 mm based on a length-weighted average. Such softwood fibers can include, but are not limited to, northern softwood, southern softwood, redwood, red cedar, hemlock, pine (e.g., southern pines), spruce (e.g., black spruce), combinations thereof, and the like. Exemplary commercially available pulp fibers suitable for the present invention include those available from Neenah Paper Inc. under the trade designations "LONGLAC-19."

In some embodiments, hardwood fibers, such as eucalyptus, maple, birch, aspen, and the like, can also be used. In certain instances, eucalyptus fibers may be particularly desired to increase the softness of the web. Eucalyptus fibers can also enhance the brightness, increase the opacity, and change the pore structure of the paper to increase the wicking ability of the paper web. Moreover, if desired, secondary fibers obtained from recycled materials may be used, such as fiber pulp from sources such as, for example, newsprint, reclaimed paperboard, and office waste. Further, other natural fibers can also be used in the present invention, such as abaca, sabai grass, milkweed floss, pineapple leaf, and the like. In addition, in some instances, synthetic fibers can also be utilized. Some suitable synthetic fibers can include, but are not limited to, rayon fibers, ethylene vinyl alcohol copolymer fibers, polyolefin fibers, polyesters, and the like.

As stated, the paper product of the present invention can be formed from one or more paper webs. The paper webs can be single-layered or multi-layered. For instance, in one embodiment, the paper product contains a single-layered paper web layer that is formed from a blend of fibers. For example, in some instances, eucalyptus and softwood fibers can be homogeneously blended to form the single-layered paper web.

In another embodiment, the paper product can contain a multi-layered paper web that is formed from a stratified pulp furnish having various principal layers. For example, in one embodiment, the paper product contains three layers where one of the outer layers includes eucalyptus fibers, while the other two layers include northern softwood kraft fibers. In another embodiment, one outer layer and the inner layer can contain eucalyptus fibers, while the remaining outer layer can contain northern softwood kraft fibers. If desired, the three principle layers may also include blends of various types of fibers. For example, in one embodiment, one of the outer layers can contain a blend of eucalyptus fibers and northern softwood kraft fibers. However, it should be understood that the multi-layered paper web can include any number of layers and can be made from various types of fibers. For instance, in one embodiment, the multi-layered paper web can be formed from a stratified pulp furnish having only two principal layers.

In accordance with the present invention, various properties of a paper product such as described above, can be optimized. For instance, strength (e.g., wet tensile, dry tensile, tear, etc.), softness, lint level, slough level, and the like, are some examples of properties of the paper product that may be optimized in accordance with the present invention. However, it should be understood that each of the properties mentioned above need not be optimized in every instance. For example, in certain applications, it may be desired to form a paper product that has increased strength without regard to softness.

In this regard, in one embodiment of the present invention, at least a portion of the fibers of the paper product can be treated with hydrolytic enzymes to increase strength and reduce lint. In particular, the hydrolytic enzymes can randomly react with the cellulose chains at or near the surface of the papermaking fibers to create single aldehyde groups on the fiber surface which are part of the fiber. These aldehyde groups become sites for cross-linking with exposed hydroxyl groups of other fibers when the fibers are formed and dried into sheets, thus increasing sheet strength. In addition, by randomly cutting or hydrolyzing the fiber cellulose predominantly at or near the surface of the fiber, degradation of the interior of the fiber cell wall is avoided or minimized. Consequently, a paper product made from these fibers alone, or made from blends of these fibers with untreated pulp fibers, show an increase in strength properties such as dry tensile, wet tensile, tear, etc.

Other examples of useful cellulose-based compositions useful in the present invention include those disclosed in U.S. Pat. Nos. 6,837,970, 6,824,650, 6,863,940 and in U.S. Patent Application Publication Nos. US20050192402 and 20040149412 each of which is incorporated herein by reference. Cellulosic webs prepared in accordance with the present invention can be used for a wide variety of applications, such as paper and paperboard products (i.e., other than paper towels), newsprint, uncoated groundwood, coated groundwood, coated free sheet, uncoated free sheet, packaging and industrial papers, linerboard, corrugating medium, recycled paperboard, and bleached paperboard. Webs made according to the present invention can be used in diapers, sanitary napkins, composite materials, molded paper products, paper cups, paper plates, and the like. Materials prepared according to the present invention can also be used in various textile applications, particularly in textile webs comprising a blend of cellulosic materials and wool, nylon, silk or other polyamide or protein-based fibers.

The paper products may contain a variety of fiber types both natural and synthetic. In one embodiment the paper products comprises hardwood and softwood fibers. The overall ratio of hardwood pulp fibers to softwood pulp fibers within the product, including individual sheets making up the product may vary broadly. The ratio of hardwood pulp fibers to softwood pulp fibers may range from about 9:1 to about 1:9, more specifically from about 9:1 to about 1:4, and most specifically from about 9:1 to about 1:1. In one embodiment of the present invention, the hardwood pulp fibers and softwood pulp fibers may be blended prior to forming the paper sheet thereby producing a homogenous distribution of hardwood pulp fibers and softwood pulp fibers in the z-direction of the sheet. In another embodiment of the present invention, the hardwood pulp fibers and softwood pulp fibers may be layered so as to give a heterogeneous distribution of hardwood pulp fibers and softwood pulp fibers in the z-direction of the sheet. In another embodiment, the hardwood pulp fibers may be located in at least one of the outer layers of the paper product and/or sheets wherein at least one of the inner layers may comprise softwood pulp fibers. In still another embodiment the paper product contains secondary or recycled fibers optionally containing virgin or synthetic fibers.

In addition, synthetic fibers may also be utilized in the present invention. The discussion herein regarding pulp fibers is understood to include synthetic fibers. Some suitable polymers that may be used to form the synthetic fibers include, but are not limited to: polyolefins, such as, polyethylene, polypropylene, polybutylene, and the like; polyesters, such as polyethylene terephthalate, poly(glycolic acid) (PGA), poly (lactic acid) (PLA), poly($\beta$-malic acid) (PMLA), poly($\epsilon$-caprolactone) (PCL), poly(p-dioxanone) (PDS), poly(3-hydroxybutyrate) (PHB), and the like; and, polyamides, such as nylon and the like. Synthetic or natural cellulosic polymers, including but not limited to: cellulosic esters; cellulosic ethers; cellulosic nitrates; cellulosic acetates; cellulosic acetate butyrates; ethyl cellulose; regenerated celluloses, such as viscose, rayon, and the like; cotton; flax; hemp; and mixtures thereof may be used in the present invention. The synthetic fibers may be located in one or all of the layers and sheets comprising the or paper product.

Cellulose-based articles can be formed by a variety of processes known to those skilled in the art. Machines may be configured to have a forming section, a press section, a drying section, and depending on the article formed, optionally a reel. Examples of the details of the process steps and schematic illustrations may be found in "Properties of Paper: An Introduction" 2nd edition W. Scott an J. Abbott, TAPPI Press 1995. In a simplified description of the process, typically a dilute suspension of pulp fibers is supplied by a head-box and deposited via a sluice in a uniform dispersion onto a forming fabric of a conventional papermaking machine. The suspension of pulp fibers may be diluted to any consistency which is typically used in conventional papermaking processes. For example, the suspension may contain from about 0.01 to about 1.5 percent by weight pulp fibers suspended in water. Water is removed from the suspension of pulp fibers to form a uniform layer of pulp fibers. Other paper-making processes, paper-board manufacturing processes, and the like, may be utilized with the present invention. For example, the processes disclosed in U.S. Pat. No. 6,423,183 may be used.

The pulp fibers may be any high-average fiber length pulp, low-average fiber length pulp, or mixtures of the same. The high-average fiber length pulp typically have an average fiber length from about 1.5 mm to about 6 mm. An exemplary high-average fiber length wood pulp includes one available from the Neenah Paper Inc. under the trade designation LONGLAC 19.

The low-average fiber length pulp may be, for example, certain virgin hardwood pulps and secondary (i.e. recycled) fiber pulp from sources such as, for example, newsprint, reclaimed paperboard, and office waste. The low-average fiber length pulps typically have an average fiber length of less than about 1.2 mm, for example, from 0.7 mm to 1.2 mm.

Mixtures of high-average fiber length and low-average fiber length pulps may contain a significant proportion of low-average fiber length pulps. For example, mixtures may contain more than about 50 percent by weight low-average fiber length pulp and less than about 50 percent by weight high-average fiber length pulp. One exemplary mixture contains 75 percent by weight low-average fiber length pulp and about 25 percent high-average fiber length pulp.

The pulp fibers used in the present invention may be unrefined or may be beaten to various degrees of refinement. Small amounts of wet-strength resins and/or resin binders may be added to improve strength and abrasion resistance. Useful binders and wet-strength resins include, for example, KYMENE 557H available from the Hercules chemical Company and PAREZ 631 available from American Cyanamid, Inc. Cross-linking agents and/or hydrating agents may also be added to the pulp mixture. Debonding agents may be added to the pulp mixture to reduce the degree of hydrogen bonding if a very open or loose nonwoven pulp fiber web is desired. One exemplary debonding agent is available from the Quaker Chemical Company, Conshohocken, Pa., under the trade designation QUAKER 2008. The addition of certain debonding agents in the amount of, for example, 1 to 4 percent, by weight, of the composite also appears to reduce the measured static and dynamic coefficients of friction and improve the abrasion resistance of the continuous filament rich side of the composite fabric. The de-bonder is believed to act as a lubricant or friction reducer.

When treating paper webs in accordance with the present disclosure, the additive composition containing the catalytic linear multi-block olefin interpolymer dispersion can be applied to the web topically or can be incorporated into the web by being pre-mixed with the fibers that are used to form the web. When applied topically, the additive composition can be applied to the web when the web is wet or dry. In one embodiment, the additive composition may be applied topically to the web during a creping process. For instance, in one embodiment, the additive composition may be sprayed onto the web or onto a heated dryer drum to adhere the web to the dryer drum. The web can then be creped from the dryer drum. When the additive composition is applied to the web and then adhered to the dryer drum, the composition may be uniformly applied over the surface area of the web or may be applied according to a particular pattern.

When topically applied to a paper web, the additive composition may be sprayed onto the web, extruded onto the web, or printed onto the web. When extruded onto the web, any suitable extrusion device may be used, such as a slot-coat extruder or a meltblown dye extruder. When printed onto the web, any suitable printing device may be used. For example, an inkjet printer or a rotogravure printing device may be used.

The dispersion may be incorporated at any point in the paper manufacturing process. The point during the process at which the dispersion is incorporated into the cellulose-based composition may depend upon the desired end properties of the cellulose-based product, as will be detailed later. Incorporation points may include pre-treatment of pulp, co-application in the wet end of the process, post treatment after drying but on the paper machine and topical post treatment. Incorporation of the dispersion of the present invention onto or in the cellulose-based structure may be achieved by any of several methods, as incorporated by reference, and known by those of ordinary skill in the art.

In yet another application, a catalytic linear multi-block olefin interpolymer dispersion formed in accordance with the disclosure, is suitable for impregnating a fibrous structure. In certain cases, a fibrous structure impregnated with such a stiffening composition can provide adequate stiffness, elasticity, resilience, adhesion, and shape retention for use in shoe stiffeners, such as toe boxes, counters, and the like. Suitable techniques for impregnation are disclosed in U.S. patent application Ser. No. 11/300,993, which is expressly incorporated by reference in its entirety.

One skilled in the art will appreciate that a desirable degree or amount of impregnation can range from a partial saturation of the fibrous structure to a complete saturation of the fibrous structure. The desired degree of impregnation can depend upon variables including the nature of the fiber being impregnated and the nature of impregnate, for example. One skilled in the art will also appreciate that the intended end properties of the impregnated structure will influence the selection of the specific ingredients (fibers and dispersions, for example) and processing parameters.

In yet another application, dispersions of the catalytic linear multi-block olefin interpolymer may be useful as toner compositions, wherein at least one selected from the group consisting of a colorant and a magnetic pigment is used with the dispersion, and wherein the dispersion has an average volume diameter particle size from about 0.3 to about 8.0 microns. Techniques for formulating such toner compositions are discussed in co-pending, co-assigned, application U.S. Provisional Application Ser. No. 60/779,126 filed on Mar. 3, 2006, which is expressly incorporated by reference in its entirety.

Briefly, after forming the dispersion, at least a portion of the liquid may be removed to form toner particles. In selected embodiments, substantially all of the water may be removed to form base toner particles. In one embodiment, drying of the dispersion may be accomplished by spray drying the dispersion. As is known in the art, spray drying involves the atomization of a liquid feedstock into a spray of droplets and contacting the droplets with hot air in a drying chamber. The sprays are typically produced by either rotary (wheel) or nozzle atomizers. Evaporation of moisture from the droplets and formation of dry particles proceed under controlled temperature and airflow conditions. Powder is discharged substantially continuously from the drying chamber. Operating conditions and dryer design are selected according to the drying characteristics of the product and powder specification.

Thus, in one embodiment, a dispersion may be formed, and shipped to another location, where the dispersion is subjected to a post-treatment process such as spray drying to form a toner powder.

In select embodiments, it is advantageous to add auxiliary fine particles to the base toner particles in order to improve the fluidity, the electrification stability, or the blocking resistance at a high temperature, etc. The auxiliary fine particles to be fixed on the surface of the base toner particles may be suitably selected for use among various inorganic or organic fine particles.

As the inorganic fine particles, various carbides such as silicon carbide, boron carbide, titanium carbide, zirconium carbide, hafnium carbide, vanadium carbide, tantalum carbide, niobium carbide, tungsten carbide, chromium carbide, molybdenum carbide and calcium carbide, various nitrides such as boron nitride, titanium nitride and zirconium nitride, various borides such as zirconium boride, various oxides such as titanium oxide, calcium oxide, magnesium oxide, zinc oxide, copper oxide, aluminum oxide, cerium oxide, silica and colloidal silica, various titanate compounds such as calcium titanate, magnesium titanate and strontium titanate, phosphate compounds such as calcium phosphate, sulfides such as molybdenum disulfide, fluorides such as magnesium fluoride and carbon fluoride, various metal soaps such as aluminum stearate, calcium stearate, zinc stearate and magnesium stearate, talc, bentonite, various carbon black and conductive carbon black, magnetite and ferrite, may, for example, be employed. As the organic fine particles, fine particles of a styrene resin, an acrylic resin, an epoxy resin or a melamine resin, may, for example, be employed.

Among such auxiliary fine particles, silica, titanium oxide, alumina, zinc oxide, various carbon black or conductive carbon black may, for example, be particularly preferably employed. Further, such auxiliary fine particles may include the above mentioned inorganic or organic fine particles, where the surface of the particles is treated by surface treatment such as hydrophobic treatment by a treating agent such as a silane coupling agent, a titanate coupling agent, a silicone oil, a modified silicone oil, a silicone varnish, a fluorinated silane coupling agent, a fluorinated silicone oil or a coupling agent having amino groups or quaternary ammonium bases. Such treating agents may be used in combination as a mixture of two or more of them.

As a method for adding the auxiliary fine particles to the base toner particles, a method is known to add and blend them by means of a high speed stirring machine such as a Henschel mixer. However, in order to improve the blocking resistance at a high temperature, it is preferred to have the auxiliary fine particles fixed on the surface of the base toner particles. In the present invention, fixing means an addition method employing an apparatus capable of exerting a compression sharing stress (hereinafter referred to as a compression shearing treatment apparatus) or an apparatus capable of melting or softening the surface of the base toner particles (hereinafter referred to as a particle surface-melting treatment apparatus). By such fixing treatment, the auxiliary fine particles may be firmly be fixed to the surface of the base toner particles without substantial pulverization of the base toner particles, whereby blocking resistance during the storage at a high temperature may be improved, and it is possible to produce a toner which is less likely to bring about fusion to components of a copying machine or a printer even in a continuous copying operation.

The above-mentioned compression shearing treatment apparatus is constructed to have a narrow clearance defined by a head surface and a head surface, a head surface and a wall surface, or a wall surface and a wall surface, which are mutually mobile while a distance is maintained, so that the particles to be treated are forcibly passed through the clearance, whereby a compression stress and a shearing stress will be exerted to the surface of the particles without substantially pulverizing them. As the compression shearing treatment apparatus to be used, a mechanofusion apparatus manufactured by Hosokawa Micron K.K., may, for example, be mentioned.

The above-mentioned particle surface-melting treatment apparatus is usually constructed so that a mixture of the base toner fine particles and the auxiliary fine particles is instantaneously heated to a temperature of at least the melting-initiation temperature by means of, for example, a hot air stream thereby to have the auxiliary fine particles fixed. As the particle surface-melting treatment apparatus to be used, a surfacing system manufactured by Nippon Neumatic K.K. may be employed.

In yet another application, dispersions using a catalytic linear multi-block olefin interpolymer may be useful as films, adhesives, or other sealing and/or packaging applications. This particular application involves applying a dispersion formulated in accordance with the above disclosure to a substrate. Those having skill in the art will appreciate that any useful substrate may be used. In particular, a wide variety of polymer substrates may be used, and even more particularly, oriented polymers may be used. Such techniques are disclosed for example, in U.S. Patent Application Publication No. 20050271888, which is expressly incorporated by reference in its entirety.

Thus, embodiments of the present invention, provide heat sealable films that may allow for higher packaging line speeds (due to lower heat seal initiation temperatures), provide the ability to seal packages over broad operating windows, and provide good package integrity.

In other words, one or more embodiments of the present invention provide the ability to seal packages over a broad operating window. During startup and shutdown of packaging lines, the temperature of the sealing equipment can often deviate, sometimes by a large amount, from the setpoint. With a packaging film having a low heat seal initiation temperature, an adequate seal can still be generated if the sealing equipment is somewhat cooler than desired.

In order to determine the heat seal initiation temperature, for each coated weight, individual strips (1 inch wide) having no backing may be heat sealed from 50 to 140° C. in 10° C. increments, using a Packforsk Hot Tack Tester set at 40 psi seal pressure and 0.5 second dwell time. Sealed samples are allowed to equilibrate for at least a day in an ASTM room set at 70° F. (21.1° C.) and 50% relative humidity before being pulled on Instron model 4501 tensile testing device at a rate of 10 inches per minute. As used herein, the temperature at which a seal strength of 0.5 lb/in is achieved is defined as the heat seal initiation temperature.

In yet another application, dispersions using a catalytic linear multi-block olefin interpolymer may be useful in forming long fiber-reinforced thermoplastic concentrates. Techniques for forming such concentrates are disclosed in co-pending, co-assigned 60/697,324, which is incorporated by reference in its entirety.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All priority documents are herein fully incorporated by reference for all jurisdictions in which such incorporation is permitted. Further, all documents cited herein, including testing procedures, are herein fully incorporated by reference for all jurisdictions in which such incorporation is permitted to the extent such disclosure is consistent with the description of the present invention.

What is claimed is:

1. An article comprising:
   (A) a frothed foam produced from a dispersion comprising:
      a catalytic linear multi-block olefin interpolymer that is a linear ethylene/α-olefin multi-block copolymer with at least 50 mole percent ethylene and having a Mw/Mn from 1.7 to 3.5, a melting point, Tm, in degrees Celsius, and density, d, in grams/cubic centimeter, wherein $$Tm > -2002.9 + 4538.5(d) - 2422.2(d)^2;$$

at least one dispersing agent comprising a polar polyolefin; wherein the catalytic linear multi-block olefin interpolymer comprises at least one hard segment and at least one soft segment; and
   the dispersion is dispersed in acrylonitrile monomer;
   (B) microcavities on at least one surface of the foam; and
   (C) the frothed foam has a compression set at 85° C., 20 minutes, at a pressure of 0.1 psig of less than 45 percent.

2. The article of claim 1, wherein the catalytic linear multi-block olefin interpolymer comprises from 5 to 70 weight percent of the at least one hard segment.

3. The article of claim 1, wherein the multi-block olefin interpolymer comprises an ethylene/octene multi-block copolymer.

4. The article of claim 1, wherein the at least one hard segment comprises from 0 to 5 weight percent α-olefin.

5. The article of claim 1, wherein the at least one soft segment comprises from 5 to 60 weight percent α-olefin.

6. The article of claim 1, wherein the multi-block olefin interpolymer comprises at least one polymer fraction obtained by preparative TREF, wherein the fraction has a block index from 0.3 to 1.0.

7. The article of claim 1, wherein the multi-block olefin interpolymer has a density from 0.875 g/cc to 0.945 g/cc and a Tm from 115° C. to 125° C.

8. The article of claim 1 wherein the dispersion comprises a dispersed particulate having an average volume diameter particle size of greater than 0 and up to about 10 micrometers.

9. The article of claim 1, wherein the dispersion comprises a dispersed particulate having an average solids content of greater than 0 up to about 80 weight percent.

10. The article of claim 1, wherein the dispersion is an aqueous dispersion.

11. The article of claim 1, wherein the frothed foam has a compression set at 85° C., 20 minutes, at a pressure of 0.5 psig of less than 70 percent.

12. The article of claim 1, comprising cells having a size ranging from about 5 micrometers diameter to about 1000 micrometers diameter.

13. The article of claim 12, wherein the cells comprise open cells.

14. The article of claim 12 wherein the cells having a size ranging from about 5 micrometers diameter to about 1000 micrometers diameter comprise greater than about 50 percent by volume of the total cells.

15. The article of claim 1, wherein the dispersion has a viscosity of not more than about 50,000 cP at 25° C.

16. The article of claim 1 wherein the microcavities cumulatively comprise from 5% to not more than 29% of the total volume of the frothed foam.

17. The article of claim 1 comprising particles of a water-absorbent polymer substantially constrained within the microcavities.

18. The article of claim 1 comprising:
    particles of a water-absorbent polymer substantially constrained within the microcavities.

19. The article of claim 18 wherein the article is selected from the group consisting of diapers, adult incontinence pants, feminine hygiene pads, household cleaning articles, pet urine absorption pads, garbage bag liquid absorbent pads.

20. The article of claim 18 wherein the article is a diaper.

21. The article of claim 18 wherein the article is a feminine hygiene pad.

22. The article of claim 1 wherein the article is a liquid absorbent layer.

23. A diaper comprising the liquid absorbent layer of claim 22.

24. A feminine hygiene pad comprising the liquid absorbent layer of claim 22.

* * * * *